United States Patent [19]

Ozawa et al.

[11] 3,761,604

[45] Sept. 25, 1973

[54] RECORDING AND REPRODUCING SYSTEM IN A ROTARY MAGNETIC MEDIUM RECORDING AND REPRODUCING APPARATUS

[75] Inventors: Keiji Ozawa, Asahi-ku, Yokohama; Seiichi Takashima, Kanagawa-ken, Kamakura; Hisao Kinjo, Yokohama, all of Japan

[73] Assignee: Victor Company of Japan, Ltd., Kanagawa-ken, Japan

[22] Filed: Sept. 3, 1971

[21] Appl. No.: 177,795

[30] Foreign Application Priority Data

Sept. 5, 1970 Japan ............................... 45/78016

[52] U.S. Cl. . 178/5.4 CD, 178/6.6 DD, 178/6.6 HS

[51] Int. Cl. ............................................ H04n 5/78

[58] Field of Search ...................... 178/5.2 R, 5.4 R, 178/5.4 CD, 6.6 A, 6.6 DD, 6.6 FS, 6.6 SF, 6.6 HS

[56] References Cited

UNITED STATES PATENTS

| | | | |
|---|---|---|---|
| R25,809 | 6/1965 | Johnson | 178/6.6 HS |
| 3,401,231 | 9/1968 | Baldwin | 178/6.6 HS |
| 3,524,018 | 8/1970 | Kihara | 178/6.6 DD |

*Primary Examiner*—Robert L. Richardson
*Attorney*—Louis Bernat

[57] ABSTRACT

A recording system comprises means for producing a frame pulse and a color frame pulse from an input NTSC system video signal. Track indication pulses consist of a feed pulse and a two bit feed pulse which cause magnetic heads to move in an intermittent stepping movement and. From the feed pulse is produced a record switching pulse which switches recording of the magnetic head. A reproducing system comprises a field setting means for effecting a H/2 processing and a chroma inverting means for inverting the phase of a subcarrier.

14 Claims, 23 Drawing Figures

INVENTORS
KEIJI OZAWA
SEIICHI TAKASHIMA
HISAO KINJO

BY [signature]
ATTORNEY

INVENTORS
KEIJI OZAWA
SEIICHI TAKASHIMA
HISAO KINJO

BY Louis Bernat
ATTORNEY

INVENTORS
KEIJI OZAWA
SEIICHI TAKASHIMA
HISAO KINJO

BY Louis Bernat
ATTORNEY

INVENTORS
KEIJI OZAWA
SEIICHI TAKASHIMA
HISAO KINJO
BY
ATTORNEY

INVENTORS
KEIJI OZAWA
SEIICHI TAKASHIMA
HISAO KINJO

BY Louis Bernat

ATTORNEY

INVENTORS
KEIJI OZAWA
SEIICHI TAKASHIMA
HISAO KINJO
BY
ATTORNEY

PATENTED SEP 25 1973

3,761,604

SHEET 07 OF 18

INVENTORS

KEIJI OZAWA

SEIICHI TAKASHIMA

HISAO KINJO

BY

ATTORNEY

INVENTORS
KEIJI OZAWA
SEIICHI TAKASHIMA
HISAO KINJO
BY [signature]
ATTORNEY

PATENTED SEP 25 1973 3,761,604

SHEET 09 OF 18

INVENTORS
KEIJI OZAWA
SEIICHI TAKASHIMA
HISAO KINJO

BY [signature]
ATTORNEY

INVENTORS
KEIJI OZAWA
SEIICHI TAKASHIMA
HISAO KINJO
BY [signature]
ATTORNEY

INVENTORS
KEIJI OZAWA
SEIICHI TAKASHIMA
HISAO KINJO

BY

ATTORNEY

INVENTORS
KEIJI OZAWA
SEIICHI TAKASHIMA
HISAO KINJO

BY [signature]

ATTORNEY

INVENTORS
KEIJI OZAWA
SEIICHI TAKASHIMA
HISAO KINJO

BY

ATTORNEY

INVENTORS
KEIJI OZAWA
SEIICHI TAKASHIMA
HISAO KINJO

BY [signature]
ATTORNEY

PATENTED SEP 25 1973

3,761,604

INVENTORS
KEIJI OZAWA
SEIICHI TAKASHIMA
HISAO KINJO

BY [signature]
ATTORNEY

PATENTED SEP 25 1973

3,761,604

SHEET 16 OF 18

INVENTORS

KEIJI OZAWA
SEIICHI TAKASHIMA
HISAO KINJO

BY [signature]

ATTORNEY

INVENTORS
KEIJI OZAWA
SEIICHI TAKASHIMA
HISAO KINJO

BY Louis Bernat

ATTORNEY

INVENTORS
KEIJI OZAWA
SEIICHI TAKASHIMA
HISAO KINJO
BY [signature]
ATTORNEY

RECORDING AND REPRODUCING SYSTEM IN A ROTARY MAGNETIC MEDIUM RECORDING AND REPRODUCING APPARATUS

This invention relates to a recording and reproducing system using a rotary magnetic medium recording and reproducing apparatus, and more particularly to a recording and reproducing system and signal processing system for a NTSC system monochrome or color video signal.

There has generally been used a magnetic recording and reproducing apparatus, in which a plurality of magnetic heads are alternately moved in an intermittent stepping movement over a rotary magnetic medium, such as a magnetic disc, a magnetic sheet or a magnetic drum. In the apparatus, a television video signal is recorded and reproduced for each field sequentially on a number of concentric tracks, while each magnetic head is at a standstill. In this recording and reproducing apparatus, reproduction is sometimes made on a time base which is different from the recording time. For example, a slow motion reproduction or a quick motion reproduction is possible. In case, for example, of a slow motion reproduction, one track is reproduced several times with the result that the same field is reproduced several times. In this case, the reproduced signal is not interlaced because the odd field and the even field do not appear alternately. If the recorded and reproduced signal is a color video signal, frequency interleaving is disturbed because the phase of the subcarrier is not inverted at each frame. Accordingly, the reproduced signal must be corrected in a field order which matches the NTSC system.

In order to correct the reproduced color video signal to become a normal NTSC system color video signal, it is necessary to provide the odd fields and even fields alternately. For this purpose, the system requires a H/2 signal processing for switching a signal which has passed through a H/2 delay line and a signal which has not passed a H/2 delay line. A chroma inverting processing circuit is designed to invert a chroma signal at a predetermined field by 180° so that frequency interleaving may be carried out. Further, a complete synchronization with an external reference synchronizing signal is required during repoduction.

It is to be noted, however, that a record mode is used in the rotary magnetic medium recording and reproducing apparatus. There are special record modes other than a normal (full field) record mode. For example, there is an alternate field record, a slow record, for field recording and an editing record such as insertion or assembly. With respect to these special record modes, some special recording method is adopted during recording. Otherwise the above described reproduced signal processing for converting the signal recorded in a special record mode into a perfect NTSC system color video signal becomes extremely difficult.

This invention is directed to a complete achievement of the record control and the reproduced signal processing, in all possible record and reproduction modes, in the rotary magnetic medium recording and reproducing apparatus.

It is a general object of the invention to provide a novel and useful recording system used in the rotary magnetic medium recording and reproducing apparatus. The system is capable of recording a signal in a predetermined field order. In the system, the fields to be recorded are discriminated indicated by two kinds of pulses, and record tracks are also indicated by two kinds of pulses.

Another object of the invention is to provide a recording system in which a recording is made by using, in connection with an NTSC system color video signal, two field discrimination pulses, i.e., a frame pulse and a color frame pulse and two track indication pulses, i.e., a feed pulse and a two bit feed pulse.

A further object of the invention is to provide a recording and reproducing system, according to which a field setting by a H/2 delay processing and a chroma inverting for inverting the phase of the subcarrier are effected during reproduction.

Other objects and features of the invention will become apparent from the description made hereinbelow with reference to the accompanying drawings, in which.

Figure 7:
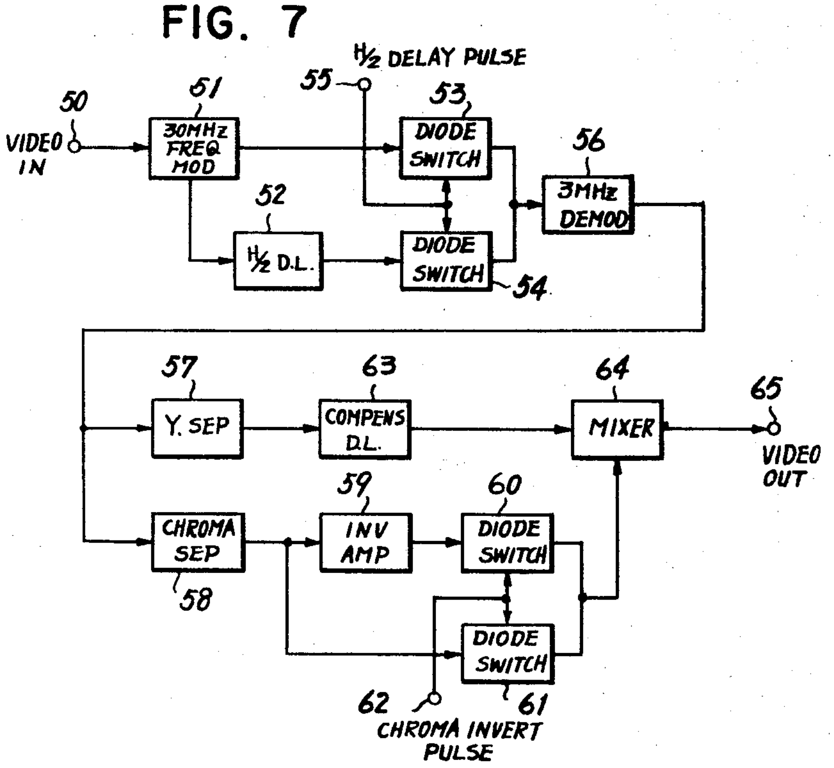
FIG. 7 is a block diagram showing one embodiment of a reproduced signal processing circuit.
Figure 23:
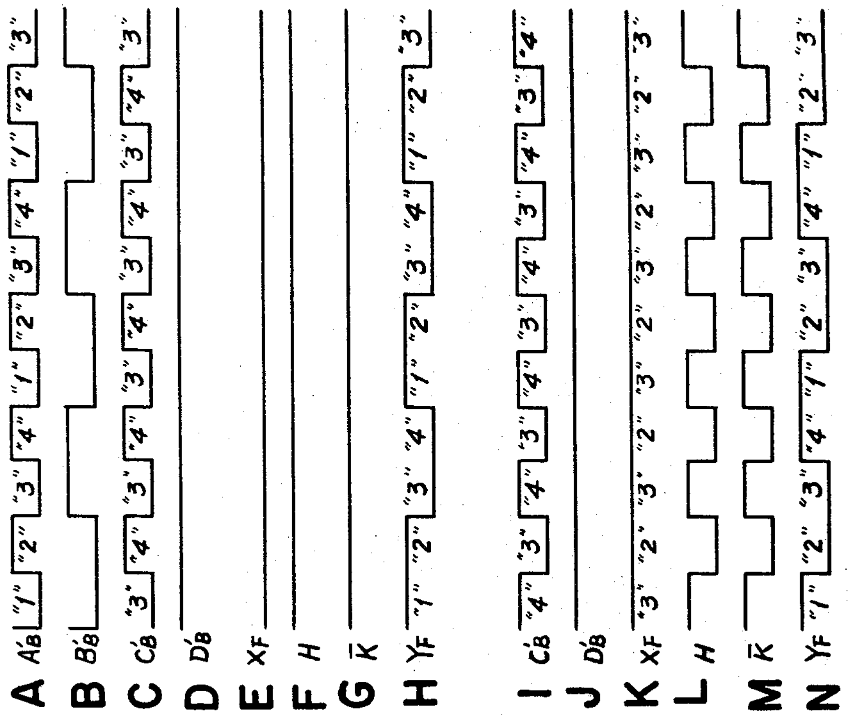
Figure 22:
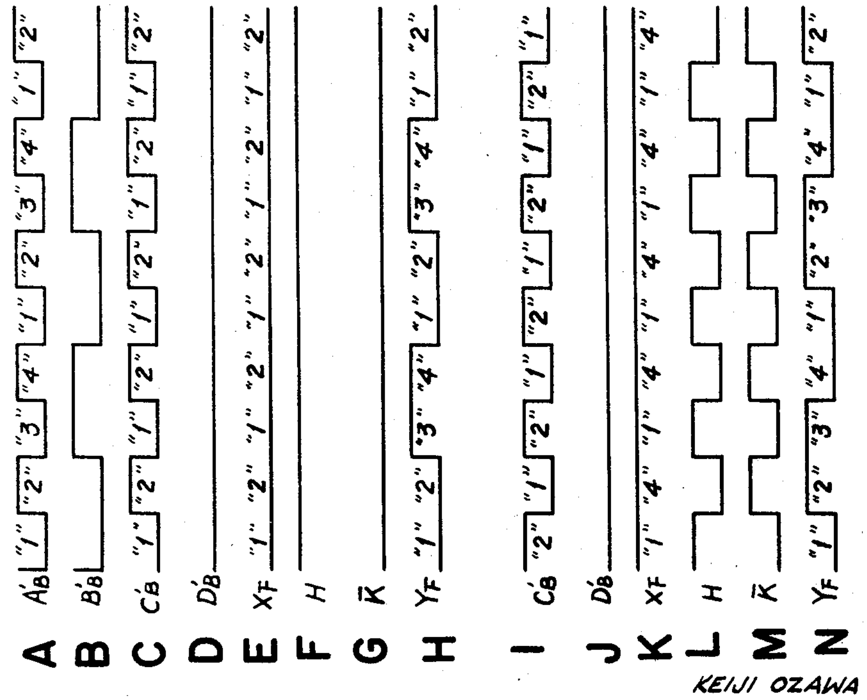

FIGS. 22A to 22N are, respectively, diagrams showing waveforms of signal and converted field at each part of the reproduced signal processing circuit shown in FIG. 7 in case of a fast forward playback at a full field recording; and FIGS. 23A to 23N are, respectively, diagrams showing waveforms of signal and converted field at each part of the reproduced signal processing circuit shown in FIG. 7 in case of a reverse playback at a full field recording.

THE ROTARY MAGNETIC MEDIUM MAGNETIC RECORDING AND REPRODUCING APPARATUS

FIGS. 1 to 4 show one example of the rotary magnetic medium magnetic recording and reproducing apparatus, to which the system according to the invention is applicable. A magnetic disc 11, shown in FIGS. 1 and 2, has upper and lower magnetic surfaces 11a and 11b. The magnetic disc 11 comprises a metal disc coated at both sides, thereof, with a magnetic substance. Or, two magnetic discs may be attached together with a cushion material therebetween. The magnetic disc 11 is rotated by, for instance, a DC motor 12 which is rotated at a velocity of 1/60 sec. per one revolution, in synchronization with a vertical synchronizing signal of a television video signal. This velocity corresponds to one field period of the video signal.

Figure 2:
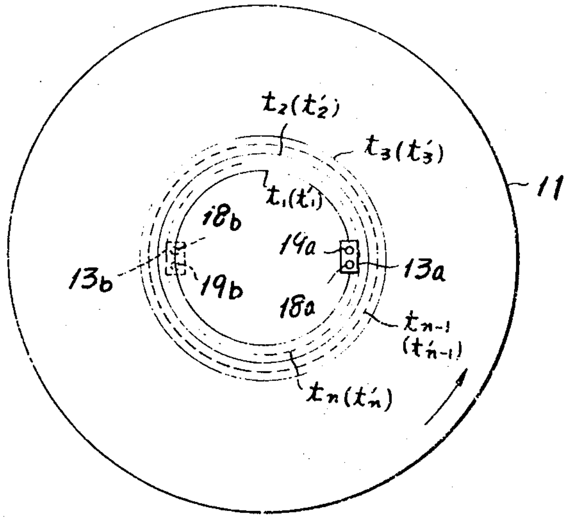
FIG. 2 is a diagram illustrating a track pattern on a rotary magnetic disc.
Figure 3:
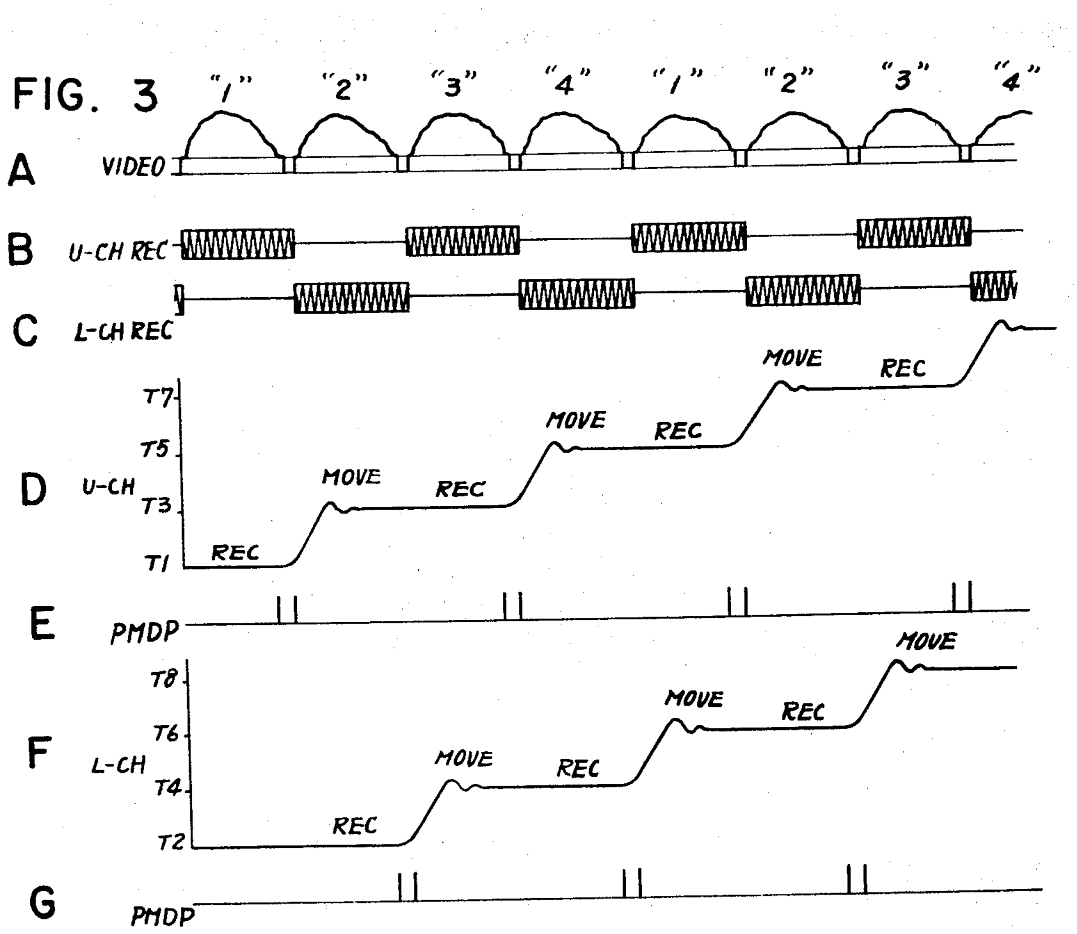
FIGS. 3A to 3G are diagrams for explaining the relationships between an input video signal, a recorded signal and the movements of a pulse motor for upper and lower channels.

Magnetic head assemblies 13*a* and 13*b* are provided for upper and lower channels, repsectively. These heads are held in abutting contact with the upper and lower magnetic surfaces 11*a* and 11*b* of the magnetic disc 11, for recording and reproducing the video signal. THe magnetic head assemblies 13*a* and 13*b* are, respectively, supported on head supports 14*a* and 14*b*, which are slidably mounted on guide bases 15*a* and 15*b* that extend in a radial direction across and in parallel with the magnetic disc 11. The head supports 14*a* and 14*b* are, respectively, fixedly mounted on belts 16*a* and 16*b* which are driven in an intermittent movement by pulse motors 17*a* and 17*b*, for the upper and lower channels, respectively The magnetic head assemblies 13*a* and 13*b* alternately make intermittent stepping movements across the magnetic surfaces 11*a* and 11*b* of the magnetic disc 11, by responsive to the rotation of the pulse motors 17*a* and 17*b* thereby repeatedly stepping and stopping alternately. The magnetic head assemblies 13*a and 13b* make the intermittent stepping movements radially from the inner circumference to the outer circumference of the magnetic disc 11. Then, the direction reverses, and stepping is from the outer circumference to the inner circumference. The heads thus form concentric tracks (as shown in FIG. 2) on the magnetic disc 11. the The magnetic head assemblies 13*a* and 13*b*, respectively, comprise erasing magnetic heads 18*a* and 18*b* which precede recording and reproducing magnetic heads 19*a* and 19*b*. When a recording process is started, the magnetic head assemblies 13*a* and 13*b* are respectively at a position to form a track of the innermost circumference. After making a recording by forming a track $t_1$, the magnetic head 19*a* makes a stepping movement, radially outwardly by two track pitches on the magnetic disc 11, and then it stops. During the stepping movement of the magnetic head 19*a*, the magnetic head 19*b* forms a track $t_1'$ on the lower surface of the magnetic disc 11. Then, the magnetic head 19*b* makes a stepping movement by two track pitches, while the magnetic head 19*a* is forming a track $t_2$. Subsequently, the magnetic heads 19*a* and 19*b* alternately repeat the intermittent stepping movements, thereby forming the recording tracks.

FIGS. 3A to 3G show the relationships between the above described operations. FIG. 3A shows a color video signal of the NTSC system. The numerals "1", "2", "3" and "4", above each field, designates four kinds of fields which are to be described later. FIGS. 3B and 3C respectively show the recording voltage waveforms of the upper and lower channels.

FIGS. 3D and 3F respectively show the movements of the magnetic head assemblies 13*a* and 13*b* for the upper and lower channels. The horizontal portion indicates a period during which the magnetic head is held at a standstill. The portion designated "REC" indicates a period during which a recording is made. The inclined portion, designated "MOVE", indicates a period during which the head makes its stepping movement.

FIGS. 3E and 3G, respectively, show pulses which drive the pulse motors 17*a* and 17*b* for recording the upper and lower channels, respectively. There are two pulses for every two fields in one channel and the two pulses for each field in alternate channels. The pulse motors 17*a* and 17*b* are rotated intermittently by these pulses, and the magnetic head assemblies 13*a* and 13*b* alternately make the intermittent stepping movements, by distances of two track pitches, per movement. The magnetic head assemblies 13*a* and 13*b* thus repeat their alternate recording and stepping movement. When they reach the outermost tracks, the heads make a stepping movement of one track pitch. After they have formed the outermost tracks, the direction of their stepping movement is reversed. The magnetic head assemblies 13*a* and 13*b* thereafter return a stepping movement from the outermost tracks to the innermost tracks. While so returning, they form tracks which lie intermediate the tracks formed during the forward movement. At the innermost tracks, the direction of the stepping movement of the magnetic head assemblies 13*a* and 13 *b* is again reversed.

Accordingly, the erasing magnetic heads 18*a* and 18*b* precede the recording and reproducing magnetic heads 19*a* and 19*b*. Thus, they erase the previous recording and make recording possible in an endless manner.

In case of a slow recording, the period of the intermittent stepping movement of the magnetic head assemblies 13*a* and 13*b* is made longer than two fields. The period during which they are at a standstill is also made longer. Inasmuch as the magnetic head assemblies 13*a* and 13*b* make a recording while erasing several preceding fields, one field stays in a recorded track immediately before the heads make the stepping movement. At the position on the innermost track, where the recording is started, the movement of the heads is somewhat different from the above described movement, due to an electronic editing, as will be described in detail later.

Figure 1:
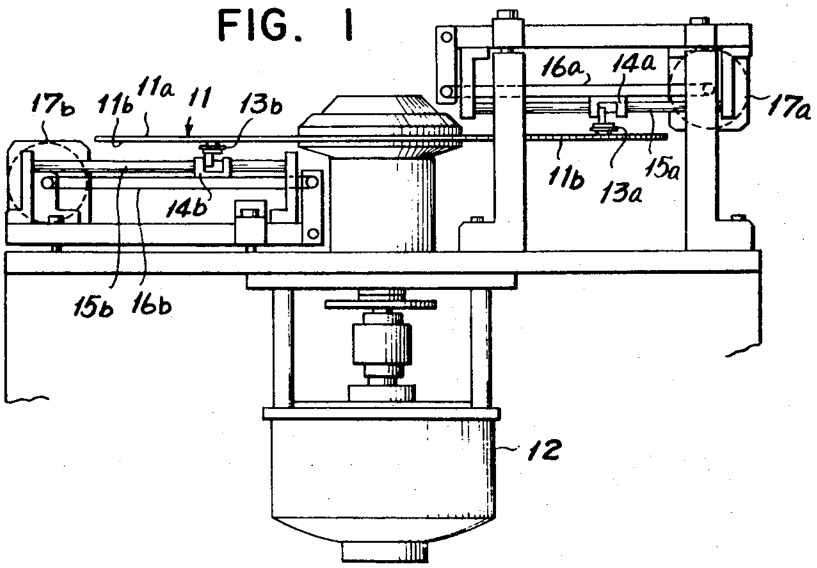
FIG. 1 is a side elevational view of one embodiment of the rotary magnetic medium recording and reproducing apparatus, which the system according to this invention.
Figure 4:
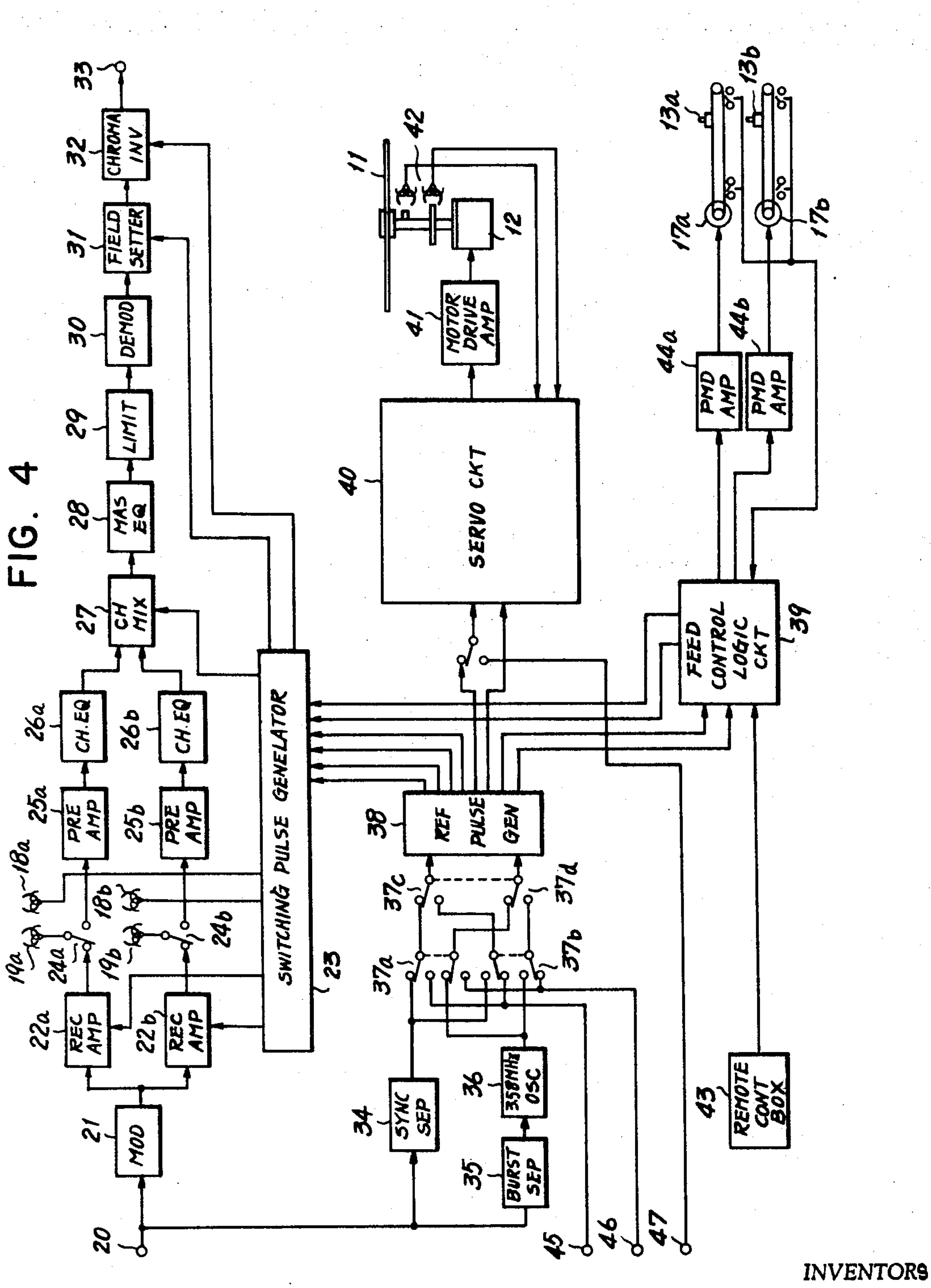
FIG. 4 is a functional block diagram of the apparatus shown in FIG. 1.

FIG. 4 is a block diagram of the electric system of the magnetic recording and reproducing apparatus shown in FIG. 1. During a recording period, an NTSC system color video signal is applied to an input terminal 20 and is modulated in a modulator 21, to become a signal adapted for a magnetic recording and reproduction. For modulating the signal, the system may use a frequency modulation system, and amplitude modulation system, or a modulation system in which frequency modulation and amplitude modulation are mixed. The output from the modulator 21 is a continuously modulated signal which is supplied to recording amplifiers 22*a* and 22*b*, alternately, responsive to recording pulses from a switching pulse generator 23. The signals amplified to an optimum recording voltage at the recording amplifiers 22*a* and 22*b*, and then they are supplied through recording-reproducing switching relay switches 24*a* and 24*b*, to the recording and reproducing magnetic heads 19*a* and 19*b*. There, the signals are recorded on the magnetic disc 11. Erasing pulses, from the switching pulse generator 23, are supplied to the erasing magnetic heads 18*a* and 18*b* for causing a DC erasing, prior to the above described recording.

In the meanwhile, the video signal from the input terminal 20 is supplied to a synchronizing signal separator 34 and a burst signal separator 35. The synchronizing signal separated by the sybchronizing signal separator 34 is supplied through switches 37*a* and 37*c* to a reference pulse generator 38. The burst signal separated by the burst signal separator 35 is supplied to a 3.58 MHz AFC oscillator 36 which goes into oscillation. The continuous signals of 3.58 MHz are supplied from the oscillator 36 to a reference pulse generator 38 through switches 37*a* and 37*d*. As will be described later, a vertical synchronizing signal, a horizontal synchronizing signal, an equalizing pulse, a frame pulse and a color frame pulse are separated at the reference pulse generator 38. These signals and pulses are supplied to the switching pulse generator 23, a feed control logic circuit 39 and a servo circuit 40.

A detailed description of the servo system will be omitted because it has no direct relationship with the subject matter of the invention. The output of the servo circuit 40 is supplied to a motor drive amplifier 41, the output of which drives the motor 12. A signal generated by the rotation of the magnetic disc 11 is picked up the head 42 and fed back to the servo circuit 40. A servomechanism is there activated to rotate the motor 12 at a velocity of 60 revolutions per second, responsive to the vertical synchronizing signal and the horizontal synchronizing signal.

All modes of the magnetic recording and reproducing apparatus are controlled by a switch from a remote control box 43. The output from the remote control box 43 is supplied to the feed control logic circuit 39, in which a necessary control pulse is produced. After having been amplified at pulse motor driving amplifiers 44*a* and 44*b*, the output of the circuit 39 drives the pulse motors 17*a* and 17*b*. A signal for detecting any displaced positions of the head assemblies 13*a* and 13*b* and for reversing the direction of the stepping movement is supplied to the feed control logic circuit 39. A part of the output from the circuit 39 is also supplied to the switching pulse generator 23.

During a reproduction period, the recording-reproducing switching relay switches 24*a* and 24*b* are switched to the reproducing side. The signals reproduced from the magnetic heads 19*a* and 19*b* are supplied to pre-amplifiers 25*a* and 25*b*, through the relay switches 24*a* and 24*b*. The reproduced signals, suitably amplified at the pre-amplifiers 25*a* and 25*b*, are equalized at the channel equalizers 26*a* and 26*b*, the difference between the two channels being compensated. The outputs from the channel equalizers 26*a* and 26*b* are supplied to a channel mixer 27 where the signals are switched to form a continuous signal by a reproduced signal switching pulse, from the switching pulse generator 23. This continuous signal is equalized and compensated in a master equalizer 28 and is reproduced as a television video signal, supplied through a limiter 29 and a demodulator 30.

The reproduced signal switching pulse is in synchronization with the movement of the magnetic head. As a result, if the reproduction mode is a mode other than a normal reproduction mode, as for example a slow motion reproduction, the same field continues several times in the reproduced video signal. Thus, the reproduced signal is not a normal NTSC color video signal. Accordingly, the video signal demodulated at the demodulator 30 is supplied to a field setter 31 (to be described later). The field setting is such that fields of odd numbers are arranged alternately with those of even numbers. Further, the phase of the subcarrier is inverted at each frame, by a chroma inverter 32. After undergoing these processes, the output signal appears at an output terminal 33, as the reproduced video signal. On the other hand, an external reference synchronizing signal and an external reference burst signal are, respectively, supplied from terminals 45 and 46 through switches 37*b*, 37*c* and 37*d* to the reference pulse generator 38. Applied at a terminal 47 is a synchronizing signal which has passed through an E—E system.

THE NTSC SYSTEM COLOR VIDEO SIGNAL AND THE PROCESSING OF THE REPRODUCED SIGNAL

As is well know, in the NTSC system color video signal, there is a distinction of an odd field and an even field for the purpose of interlaced scanning. Further, a frequency interleaving system is adopted to insure compatibility between monochrome and color systems and of a frequency band. In the case wherein a color video signal is received by a monochrome receiver, the phase of chrominance subcarrier is altered by 180° at each horizontal scanning period (hereinafter referred to as H) or at each frame, so as to make the chroma signal inconspicuous. Accordingly, the phase of the subcarrier at a certain point in one frame tends to be cancelled by 180° displacement from the phase of the subcarrier at a corresponding point in the next frame. Hereinafter, a pair of frames in which the phases of the subcarrier are different by 180°, i.e., two frames in a monochrome video signal, is referred to as "one color frame." Accordingly, in the NTSC system color video signal, there are four kinds of fields, namely, two kinds of odd fields in which the phase of the subcarrier is shifted by 180° with respect to each other and two kinds of even fields in which the subcarrier is also shifted in phase by 180°. This relationship is shown in FIGS. 5A to 5F.

Figure 5:
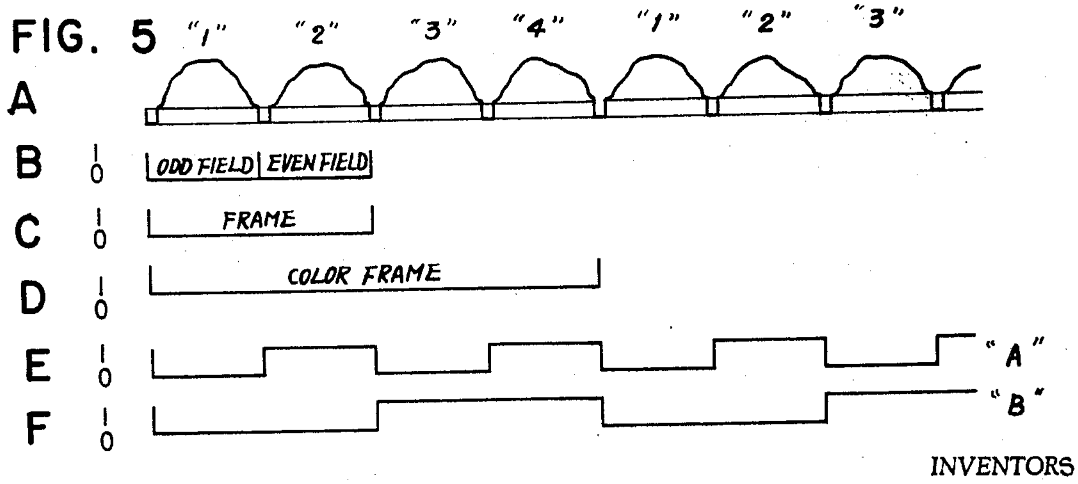
FIGS. 5A to 5F are diagrams for explaining the relationships between a NTSC system color video signal, each field, each frame, each color frame, a frame pulse and a color frame pulse.

FIG. 5A shows the NTSC system color video signal. Numbers "1", "2", "3" and "4" written above the wave form describes four different kinds of fields. For convenience the fields "1" and "3" represent the odd fields and the fields "2" and "4", the even fields. The phase of the subcarrier at a certain point in the field "1" is 180° out of phase as compared to the phase at a corresponding point in the field "3". The same is true with respect to the fields "2" and "4". In the NTSC system color video signal, the order of the fields must always be "1", "2", "3", "4", "1", "2", . . . . . . In this case, the phase of the subcarrier is continuous. FIG. 5B shows the odd field and the even field. FIG. 5C shows one frame and FIG. 5D shows one color frame. FIG. 5E shows a frame pulse A which switches between (0) and (1) states during each field. The (0) state of the frame pulse A represents the odd fields, and the (1) state represents even fields. FIG. 5F shows a color frame pulse B which switches between (0) and (1) states during each field. For convenience, the (0) state of the color frame pulse B represents the phase of the subcarrier at 0°, and the (1) state at 180°. The four kinds of fields can be identified and distinguished from each other by simultaneously comparing the states of the two pulses A and B shown in FIGS. 5E and 5F.

Figure 6:
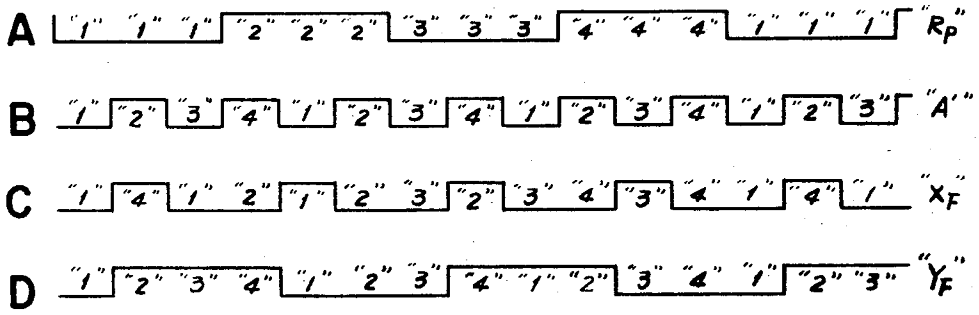
FIGS. 6A to 6D are diagrams for explaining the relationships between a signal processing pulse and a field converted by signal processing in case of a slow motion reproduction at a ratio of 3 : 1.

FIGS. 6A to 6D show signal processing pulses, and a converted pulses produced responsive to this signal processing pulse, in order to provide a slow motion reproduction at a processing ratio of 3 : 1. More particularly FIG. 6A shows a wave form of switching pulses "Rp" which causes a reproduction of each track for three successive field periods. Accordingly, the reproduced signal is one in which each of the fields "1", "2", "3" and "4" is repeated three times. The reproduced signal is not one in which the fields "1", "2", "3" and "4" are sequentially arranged side by side, with one field each. FIG. 6B shows a wave form of field discriminatoin pulses "A" derived from an external reference source; of synchronizing signals during a reproduction period. The field arrangement of the reproduced signal shown in FIG.6A must coincide with the field arrangement shown in FIG.6B.

Accordingly, as shown in FIG. 6C, the H/2 processing is effected, as will be described later, responsive to an H/2 processing wave form of pulses "$X_F$". The odd fields and the even fields are alternately arranged. The H/2 processing is made by introducing a H/2 period delay. During the (0) state of the H/2 processing pulses $X_F$, the H/2 processing is not made. However, during the (1) state the H/2 processing is made. During the (1) state of the pulse $X_F$, the H/2 processing, namely the H/2 delay, is made, and the time of the reproduced fields becomes substantially aligned with that of the preceding fields. The fields "1", "2", "3" and "4", which correspond to the """ state of the H/2 timing pulse $X_F$, respectively, become fields "4", "1", "2" and "3", as shown in FIG. 6C.

In the field arrangement shown in FIG.6C, the odd fields and the even fields are alternately arranged. Accordingly, an interlaced scanning is possible in this field arrangement. However, the problem of the subcarrier still remains unsettled. In order to settle this problem, a chroma inverting process is made responsive to a chroma inverting pulse "$Y_F$" as shown in FIG.6D. The chroma inverting processing is made not during a (0) state but is made during the (1) state of the pulse $Y_F$. Since the phase of the subcarrier is inverted during the (1) state of the pulse $Y_F$, the processed field is converted into a field which is substantially the same a frame which is displaced apart therefrom. Namely, the fields "4", "1", "2" and "3" are converted into the fields "2", "3", "4" and "1". Accordingly, as shown in FIG.6D, the total arrangement of the fields which have undergone the H/2 processing and the chroma inverting processing coincide with the field arrangement shown in FIG.6B which is a complete NTSC system color video signal.

FIG.7 shows a block diagram of one embodiment of the reproduced signal processing circuit. The reproduced signal is received at an input terminal 50 and supplied to a frequency modulator 51 having a band width of 30 MHz, where it is frequency mouldated. The output from the frequency modulator 51 is delayed on one hand by a period of H/2 since it is fed through a H/2 delay line 52 of a crystal type, and then it is supplied to a diode siwitch 54. THe output from the frequency modulator 51 is also supplied directly to a diode switch 53, without being delayed. The H/2 delay pulses, generated in a manner to be described later, are applied from a terminal 55 to the diode switches 53 and 54. When the H/2 delay pulse is in a (1) state, the diode switch 54 permits the signal to pass, and when the H/2 delay pulse is in a (0) state, the diode switch 53 permits the signal to pass. The output from the diode switches 53 and 54 are demodulated by a demodulator 56 having a band width of 30 MHz. The foregoing circuit corresponds to the field setter 31 shown in FIG. 4.

The output signal from the demodulator 56 is supplied to a luminance signal separator 57 and a chroma signal separator 58 where the signal is separated into a luminance signal and a chroma signal. The luminance signal thus separated is delayed by a predetermined period by means of a compensation delay line 63. Then, the luminance signal coincides in time with a chroma signal component, to be described later, and then is supplied to a mixer 64. In the meanwhile, the separated chroma signal is supplied, on one hand, through an inverting amplifier 59, to a diode switch 60, and, on the other hand, directly to a diode switch 61. The diode switches 60 and 61 are switched by a chroma inverting pulse received from a terminal 62, the inverting pulses being generated in a manner to be described later. When the chroma inverting pulse is in a (1) state, the diode switch 60 permits the signal to pass, and when the pulse is in a (0) state, the diode switch 61 permits the signal to pass. The chroma signal which has passed through the diode switches 60 and 61, and has been switched therein, is then supplied to the mixer 64 where it is mixed with the luminance signal. The output video signal from the mixer 64 is taken out from an output terminal 65. The above described circuit corresponds to the chroma inverter 32 shown in FIG.4.

ELECTRONIC EDITING

In order to achieve a perfrect signal processing of the reproduced signal, it is necessary to detect and discriminate between the types of fields which are being reproduced. Further, even if this field discrimination is made, it will be extremely difficult to obtain a reproduced signal processing pulse in the event that the field arrangement is not made in a certain order. This is particularly true if a recording other than normal recording, such as a slow motion recroding or one field recording, is made. In this case, the relation relationship between the track to be recorded and the field tends to become random. Thus, a train of signal processing pulses cannot be generated to follow a certain rule even if a pulse for discriminating between the fields can be generated from the reproduces signal itself. It is not easy to produce the field discrimination pulse from the reproduced signal itself due to such problems as the quality of the signal and the delay thereof.

With a view to settling these problems, in the system according to the invention, the field discrimination of the signal to be recorded is made during recording. As described above, the indication is made by the field indication pulses, i.e., the frame pulse A and the color frame pulse B. As to the record tracks, the tracks are indicated by two kinds of track indication pulses C and D, which are both in the (0) state at a record starting track. These track indication pulses C and D are indicative of each track and are determined according to the mechanical position of the magnetic heads. Each track indicated by has either the track C or D pulses fixed thereto. Hence, if it is determined that a recording is made for fields in which the pulses A and C and the pulses B and D coincide, the field recorded on each track is a particular field. Consequently, the track indication pulses C and D, which are determined according to the mechanical position of the magnetic heads can be used as the pulses A and B for discriminating between the types of fields during reproduction. Thus, the reproduced signal processing can be made relatively simply by comparing the field indication pulses A and B of the external reference synchronizing signal with the track indication pulses C and D.

Figure 8:
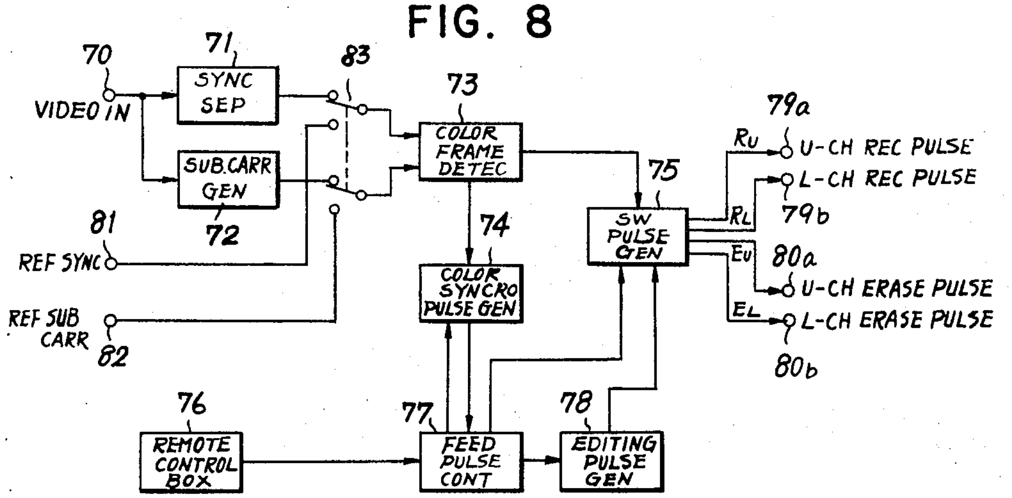
FIG. 8 is a block diagram showing one embodiment of an electronic editing circuit.

FIG.8 shows a block diagram of one embodiment of electronic editing circuit for carrying out the above described recording system. During recording, the input video signal from an input terminal 70 is supplied to a synchronizing signal separator 71 and to a subcarrier generator 72, comprising a 3.58 MHz AFC oscillator. The synchronizing signal, separated at the synchronizing signal separator 71, and the continuous 3.58 MHz subcarrier frequency signal, produced by the burst signal separated at the subcarrier generator 72, are respectively supplied to a color frame detector 73 via recording-reproducing switching relay contacts 83 which are now switched to the recording side. The frame pulse A, the color frame pulse B, the equalizing pulse E, the vertical synchronizing pulse V etc., are produced in the color frame detector 73.

In the meanwhile, a particular mode is selected at a remote control box 76, and a driving pulse for driving the pulse motor is generated in a feed pulse controller 77. For effecting the above described electronic editing, the frame pulse A and the color frame pulse B from the color frame detector 73 and the track indication pulses C and D from the feed pulse controller 77 are compared in a color synchorinizing pulse generator 74. When the pulses coincide with each other, the color synchronizing pulse is by generator 74 and supplied to the feed pulse controller 77.

Responsive to this, synchronizing pulse the pulse motor driving pulse and the switching pulse for recording and reproduction are respectively supplied from the feed pulse controller 77 to a pulse motor driving amplifier and to a switching pulse generator 75. Also, an editing pulse generator 78 supplies a pulse for setting the phases at the starting and completion of recording to the switching pulse generator 75. Upper channel and lower channel recording pulses $R_U$ and $R_L$ are sent from the switching pulse generator 75 to the output terminals **79*a* and 79*b*. Also, upper channel and lower channel erase pulses $E_U$ and $E_L$ are respectively fed from output terminals 80*a* and 80*b***.

The foregoing is an outline of the electronic editing which is made during recording. During reproduction, the recording-reproduction switching relay switch 83 is switched to the reproduction side The reference synchronizing signal and the reference subcarrier signal from the terminals 81 and 82, respectively, are used.

Nextly, the phase relation relationship between the editing pulse and the recording-reproduction switching relay will be explained with reference to FIGS.9A to 9D.

Figure 9:
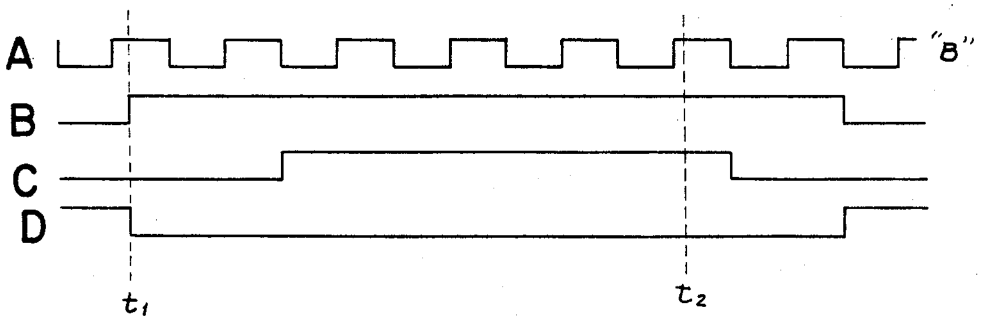
FIGS. 9A to 9D are diagrams showing the phase relationships between a synchronizing signal, an editing pulse and operations of recording and reproducing relays.

FIG.9A shows the wave form of color frame pulses B which has four fields in each period. FIG.9B shows the state of operation of the recording relay. FIG.9C shows the editing pulse. FIG.9D shows the rate of operation of the reproduction relay. The relays respectively operate during the (1) state and release during the (0) state.

Assume now a switch is pushed for a record mode at a desired time $t_1$. The recording relay operates immediately as shown in FIG.9B, and the reproduction relay releases immediately as shown in FIG.9D. However, the editing pulse appears only after the lapse of the one complete color frame which immediately follows time $t_1$ as shown in FIG.9C. This delay period of operation provided for warming-up the recording amplifier, modulator etc. In the present embodiment, the delay is during one color frame however the scope of the invention is not limited to a period of this duration but it may have a contruction such that the delay covers several fields to several color frames.

A switch is pushed for reproduction mode at a desired time $t_2$. The editing pulse (FIG. 9C) maintains the ON state until the end of the next complete color frame pulse. Then, the editing pulse disappears, as shown in FIG.9C. The recording and reproduction relays respectively maintain their operated and relased states for one further color frame (or perhaps several frames). Then, the states of these relays are respectively switched into released and operated conditions. The recording relay and the reproduction relay are used to create the state E—E mode. When both relays are released, the E—E mode is created.

One embodiment of a concrete electrical circuit of each block included in the block diagram shown in FIG.8 will be described hereinbelow.

Figure 10:
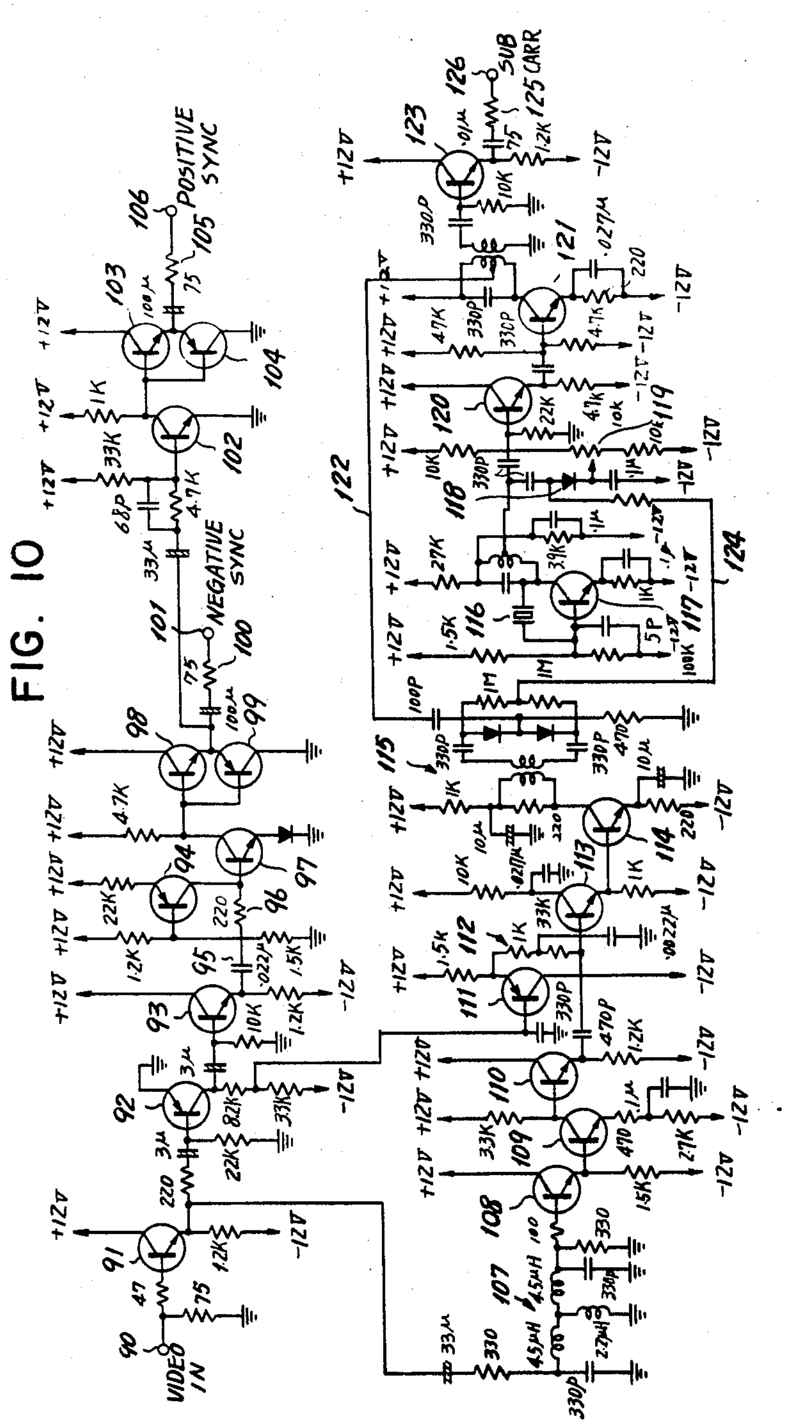
FIG. 10 is a circuit diagram showing one embodiment of a sync separator and a subcarrier generator.

FIG.10 shows one embodiment of an electrical circuit of the synchronizing signal separator 71 and the subcarrier generator 72. The input video signal received an input terminal 90 passes through a transistor 91 of an emitter follower connection. Then the signal is amplified, on one hand, by a transistor 92 and is supplied to a transistor 93 of an emitter follower connection. A transistor 94 is a constant-current which serves, in cooperation with a capacitor 95 of 0.022 $\mu$F and a resistor 96 of 220Ω, to clamp a sync-tip of the video signal. At a transistor 97 the synchronizing signal is separated from the video signal whose sync-tip has been clamped. The separated synchronizing signal is made into a negative sync signal by transistors 98 and 99 which are of a complementary emitter follower connection. The negative signal is then fed from an output terminal 101 via a resistor 100 of 75 Ω, which determines the output impedance.

On the other hand, the output negative sync from the transistor 98 and 99 is inverted in phase by an inverter comprising of a transistor 102. After passing through transistors 103 and 104, of a complementary emitter follower configuration, and a resistor 105 of 75Ω, the signal taken out from an output terminal 106 as a positive sync.

In the meanwhile, the output from the transisotr 91 is also supplied to a band pass filter 107, where the chroma signal is separated. The separated chroma signal passes through a transistor 108 of an emitter follower connection, is amplified at a transistor 109, and is transmitted to a transistor 113 by means of a transistor 110 of an emitter follower connection. On the other hand, the signal amplified at the transistor 92 is integrated in an integration circuit 112 after having passed through a transistor 111 of an emitter follower connection. The integrated signal is applied to the base of the transistor 113. At the transistor 133, only the burst signal is separated from the chroma signal. The separated burst signal is amplified at a transistor 114 and is supplied to a phase detecting circuit 115 as one part of the input thereto. An oscillator comprising a crystal element 116 and a transistor 117 oscillates at a frequency in the neighborhood of 3.58 MHz. The output of this oscillator passes through a transistor 120 of an emitter follower configuration and is amplified at a transistor 121. A part of the oscillator output is then supplied through a line 122 to the phase detecting circuit 115 as the other part of the input thereto.

The phase detecting circuit 115 performs a phase detection of the burst signal in comparision with the oscillator output during a certain period of the burst. The output error voltage from the phase detecting circuit 115 is applied to a varicap capacitor 118 via a line 124 to control the oscillation frequency or phase of the oscillator consisting of the transistor 117. A variable resistor 119 is adapted to vary the operating point of the varicap 118, thereby to perform an AFC operation. The output circuit of the amplifier includes the transistor 121, and a continuous 3.58 MHz subcarrier, is taken out from an output terminal 126, after passing through a transistor 123 of an emitter follower configuration and a resistor 125 of 75Ω. The subcarrier output is substantially in phase with the burst signal.

Figure 11:
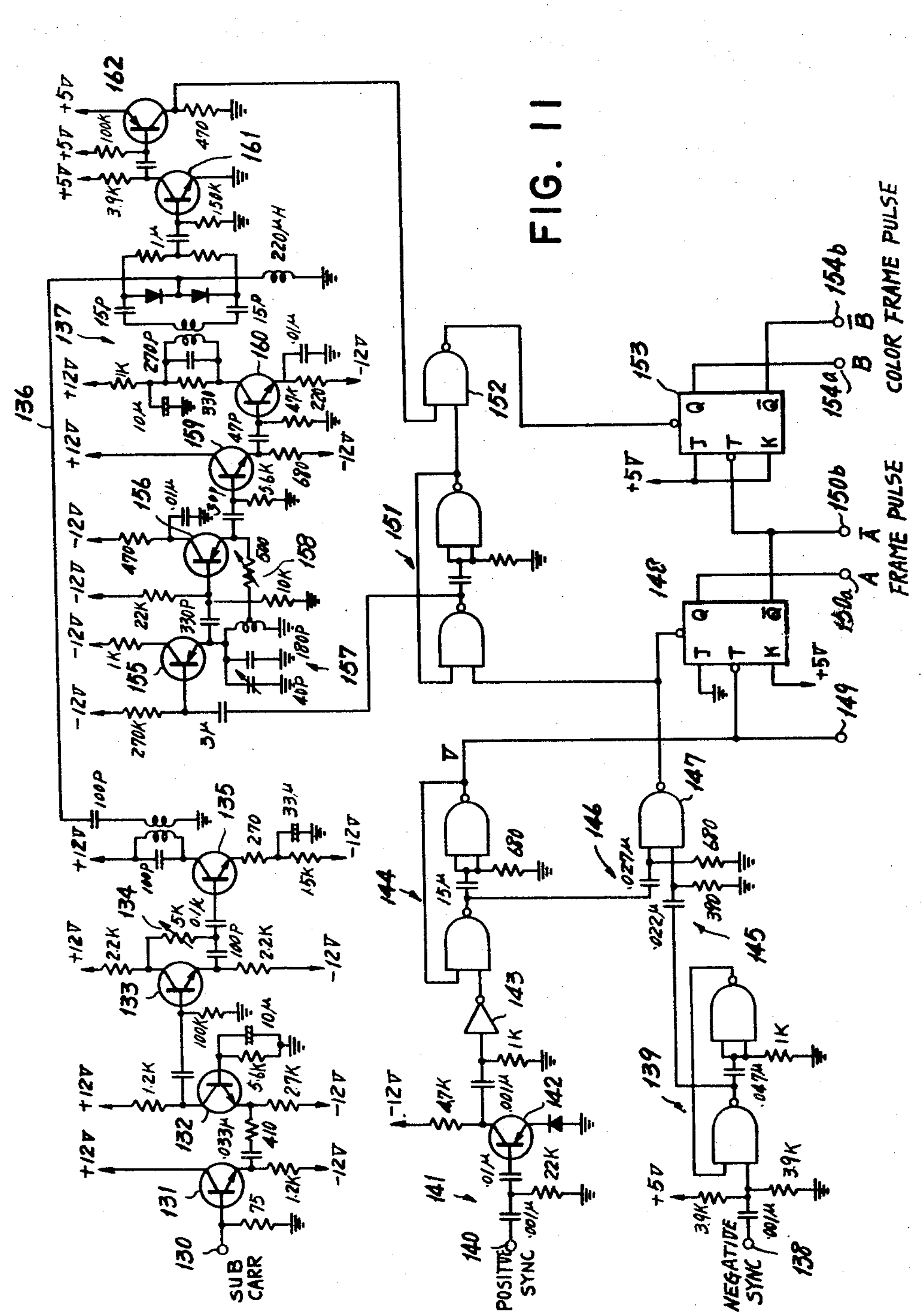
FIG. 11 is a circuit diagram showing one embodiment of a color frame detector and a frame pulse and color frame pulse generator.

FIG.11 shows one embodiment of a concrete electrical circuit of the color frame detector 73 shown in FIG.8. As described in the foregoing, the NTSC system color video signal has four kinds of fields. In order to discriminate between these fields, one distinctive signal of some kind is required for each of four fields. With regard, for instance, to the two odd fields, the phases of the subcarriers are different from each other by 180° from each other is the pulsed oscillator output of 3.58 MHz is triggerd by the rising edge of the frame pulse. The subcarriers are compared in phase, and if they are out of phase by 90°, a negative error voltage will be obtained on one side, in case the other side is in a positive phase. By correcting one of them, one pulse can be obtained for four fields.

In FIG.11 the input subcarrier, from an input terminal 130, passes through a transistar 131 of an emitter follower configuration. This subcarrier is amplified by a transistor 132 of a grounded base configuration. Then, the subcarrier is supplied to the base of a transistor 133. The transistor 133 constitutes a phase shifter in which the phase of its output is varied by adjustment effected by an variable resistor 134, so that a phase detection error voltage, to be described later, becomes maximum.The output signal from the phase shifter transistor 133 is amplified by a transistor 135. The amplified output passes through a line 136 and is supplied to a phase detector 137 as one part of the input signal thereto.

The negative sync pulse is supplied from the terminal 101 shown in FIG.10 to an input terminal 138. The negative sync pulse is caused to repeat the states (0) and (1) at each 1H, by a monostable multivibrator 139. That is to say, this sync pulse becomes a pulse of H rate. Likewise, the positive sync pulse supplied from the terminal 106 shown in FIG.10 to an input terminal 140 is differentiated in a differentiation circuit 141 and switched at a transistor 142, whereby it is converted into a vertical synchronizing signal. The output from the transistor 142 is reversed in its polarity by an inverter 143. Then it triggers a monostable multivibrator 144. The output signal from the monostable multivibrators 139 and 144 are respectively differentiated at their leading or rising edge by differentiation circuits 145 and 146 and supplied to a NAND gate 147. The output from the NAND gate 147 is applied to a J–K flip-flop 148, as a reset pulse. The J–K flip-flop 148 emits a pulse at a position of the vertical synchronizing signal of the odd field and thereby makes a timing pulse of an output pulse V from the monostable multivibrator 144, which pulse V has a rising edge which is in phase with the vertical synchronizing signal. The output pulse V, from the monostable multivibrator 144, is taken out from a terminal 149. The output Q of the J-K flip-flop 148 is a frame pulse A, which breaks at the vertical sycnhronizing signal of the odd field and becomes a (0) state signal during the odd field and a (1) state signal during the even field. The output Q is taken out from an output terminal 150*a*.

The output from the NAND gate 147 triggers, on the other hand, a monostable multivibrator 151 which is provided for determining the pulse width. From the monstable multivibrator 151, an output pulse is obtained having a width of about 3 $\mu$, which is in synchronization with the rising up edge of the frame pulse A. Transistors 155 and 156, a resonance circuit 157, and a variable resistor 158 constitute a pulsed oscillator. The pulsed oscillator has a feature whereby it starts oscillation only when there is a pulse input. The phase at the start of oscillation is constant, and it stops oscilation when the incoming pulse ceases. The transistor 155 determines the starting and stopping of oscillation of the pulsed oscillator. The transistor 155 always remains ON when there is no pulse from the monostable multivibrator 151, thereby damping a tank circuit 157 at a very low impedance. The transistor 155 switches OFF when a pulse is applied to its base, and it causes a Hartley oscillator comprising a transistor 156 to start its oscillation. THe oscillation frequency of this pulsed oscillator is determined by the circuit constants of the resonant circuit 157. In this embodiment, the oscillation frequency is approximately 3.58 MHz. The resistance value of the variable resistor 158 is selected so that the oscillation output becomes constant during the oscillation period.

The oscillation output from the pulsed oscillator passes through a transistor 159 of an emitter follower configuration, and it is amplified at a transistor 160. The amplified output is supplied to the phase detecting circuit 137, as the other part of the input thereto. The phase detecting circuit 137 compares the phase of the subcarrier and that of the output from the pulsed oscillator. The oscillation frequency does not require a great stability because the period during which the phases are compared is very short. If a greater stability is required for the oscillation frequency of the pulsed oscillator, the above described Hartley oscillator may be replaced by a Clapp oscillator. The output error voltage from the phase detecting circuit 137 alternately becomes positive and negative at each frame and is adjusted to a maximum value by the variable resistor 134 for phase shifting. The output error voltage from the phase detecting circuit 137 is supplied to a transistor 161 where the error voltage on the positive side only is switched and taken out. Then, the output is inverted in an inverter consisting a transistor 162.

The output from the inverter 162 is supplied to the NAND gate 152 and is corrected in its form by the output from the monostable multivibrator 151. The output pulse from the NAND gate 152 is a pulse which rises once every four fields and is supplied to the J–K flip-flop 153. On the other hand, the output $\overline{Q}$ from the J–K flip-flop 148 is supplied to the J–K flip-flop 153 as a timing pulse, where it is counted down to provide a period which is double the initial period. The output from the NAND gate 152 is used for determining the phase of the J–K flop-flop 153. The output $\overline{Q}$ from the J–K flip-flop 153 is taken from an output terminal 154*a* as a color frame pulse B. The color frame pulse B always has a constant phase, and is generated in accordance with the color frame discriminated by the phase detecting circuit 137.

Figure 12:
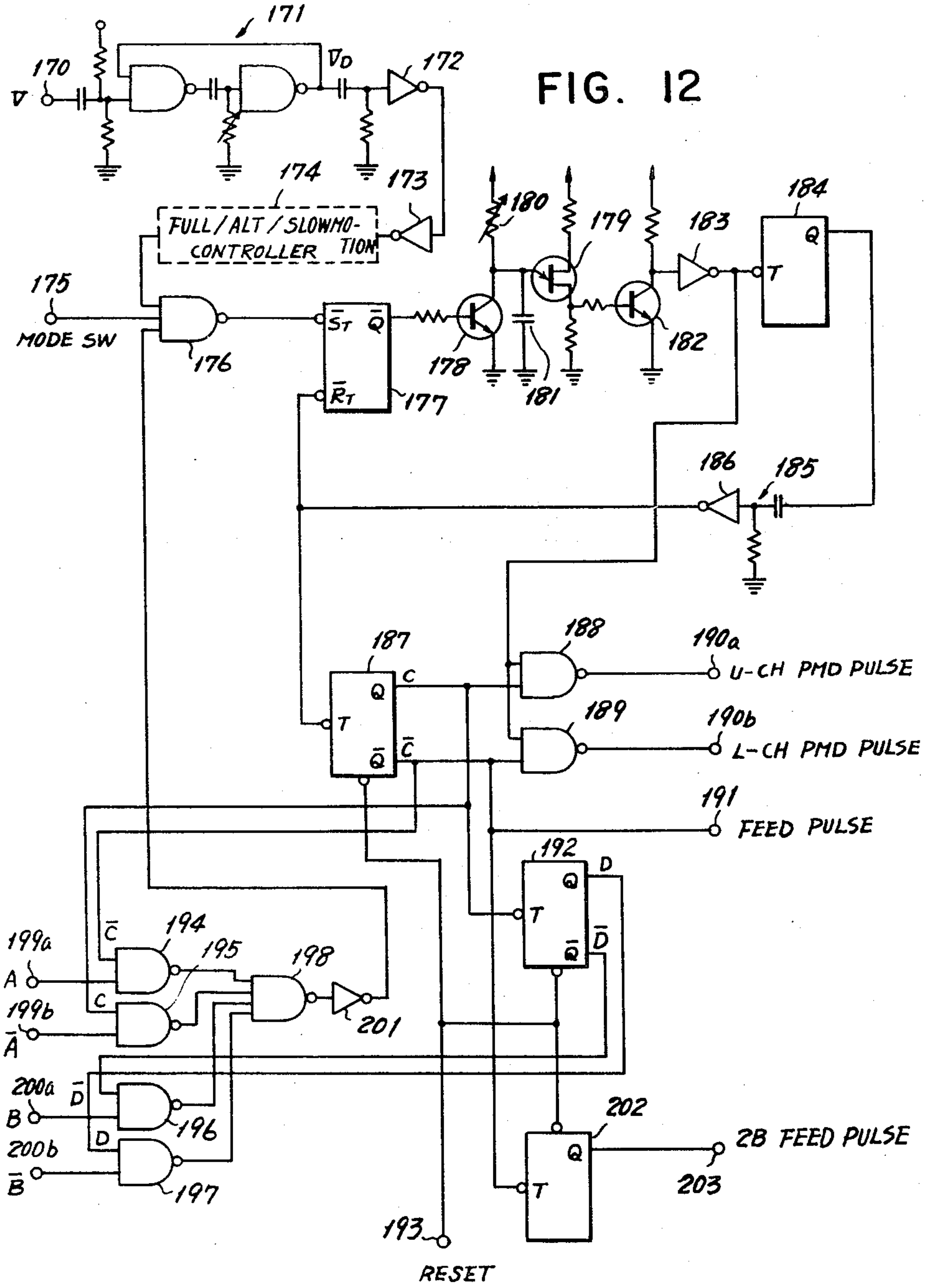
FIG. 12 is a circuit diagram of one embodiment of a feed pulse controller.

FIG.12 shows one embodiment of a concrete electrical circuit of the feed pulse controller 77 shown in FIG.8. As will be described later, the switching phase for recording and reproduction is selected at a position following the vertical synchronizing signal. The pulse motor driving pulse must be selected at a position preceding the vertical synchronizing signal, in consideration of the rising edge characteristic of the pulse motor. the pulse motor may make the stepping motion in a minimum length of time and recording may be made after the motor stops completely. This phase is obtained by delaying the vertical synchronizing signal output from the terminal 149 shown in FIG.11 and is applied to a terminal 70 by means of a monostable multivibrator 171. The pulse of this phase passes through inverters 172 and 173 and is suitably divided in frequency by a full-alternate-slow motion controller 174. Then, the pulse is supplied to a NAND gate 176. In case of a full field recording, for instance, the output $V_D$ from the controller 176 is as shown in FIG.13G.

Figure 13:
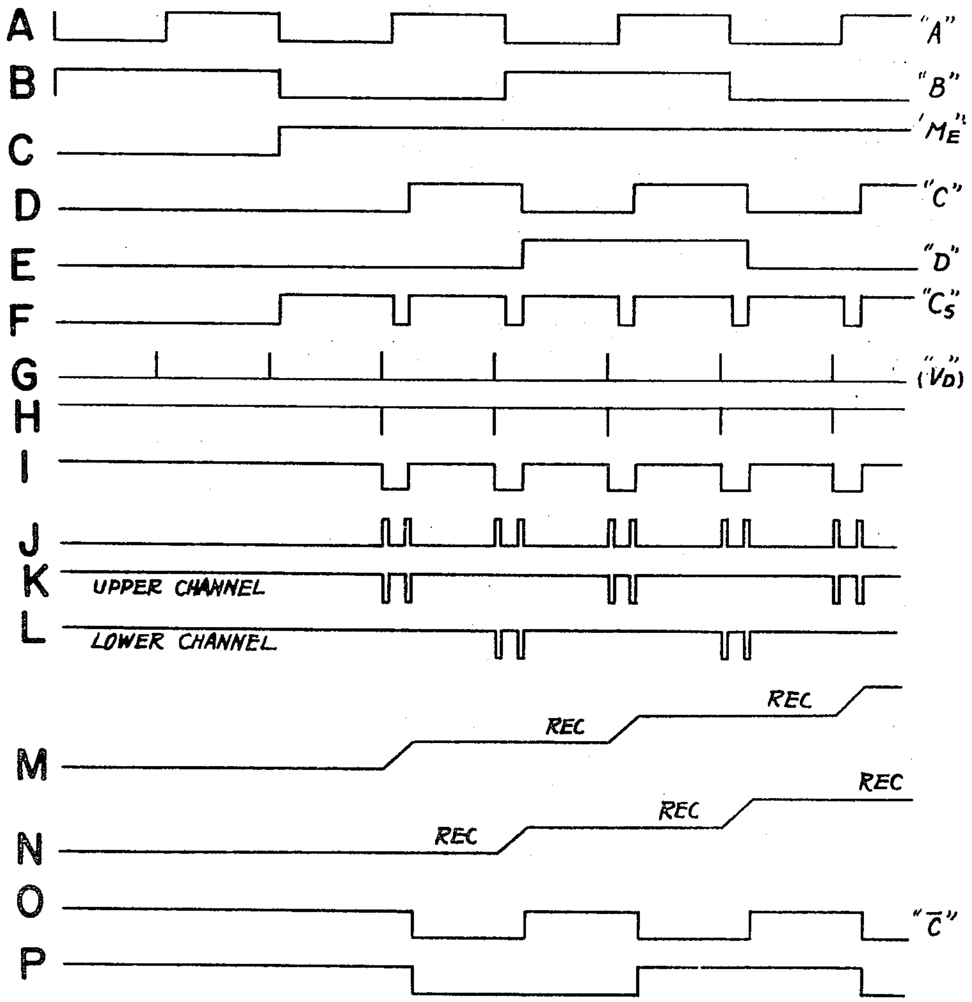
FIGS. 13A to 13P are, respectively, diagrams showing a signal waveform at each part of the feed pulse controller shown in FIG. 12.

A record start instruction pulse $M_E$, shown in FIG. 13C is sent from the mode switch of the remote control box 76, shown in FIG.8, to a terminal 175 and a NAND gate 176. A color synchronizing pulse $C_S$, shown in FIG.13F, is simultaneously supplied to the NAND gate 176, thereby to effect gating. The output from the NAND gate 176 is supplied to a set-reset flip-flop 177, as a trigger pulse.

As has been described with reference to FIGS.1 and 2, the tracks of forward and reverse directions must be formed alternately. For this purpose, the pulse motor which is rotated by one track pitch responsive to one pulse and is rotatated by two track pitches responsive to two pulses. Accordingly, two pulses must be formed by one trigger. The circuit construction for this purpose is described hereinbelow. When a trigger pulse from the NAND gate 176 sets the set-reset flip-flop 177, the output $\overline{Q}$ therefrom becomes a (0) state as shown in FIG.13I. The output from the flip-flop 177 is applied to the base of a transistor 178 of a grounded emitter. An oscillator consisting of a unijunction transistor (UJT) 179, a variable resistor 180, and a capacitor 181 is normally prevented from oscillation by the ON state of the transistor 178. When the output $\overline{Q}$ from the flip-flop 177 becomes a (0) state, the transistor 178 switches OFF, whereby the oscillator starts oscillation at a frequency which is determined by the resistatnce value of the variable resistor 180 and the value of the capacitance of the capacitor 181.

The output from the oscillator including the UJT 179 is switched at a transistor 182, corrected in its form at an inverter 183, and counted down at a flip-flop 184. The output Q from the flip-flop 184 is a pulse which becomes a (1) state at the rising edge of the first input pulse and returns to a (0) state at the start of the next pulse. This output Q is differentiated in a differentiation circuit 185 and then corrected in its breaking at an inverter 186. The output from the inverter 186 is applied, on one hand, to the reset terminal of the set-reset flip-flop 177. thereby to reset it. The output $\overline{Q}$ from the set-reset flip-flop 177 is as shown in FIG.13I. When the flip-flop 177 is reset, its output becomes a (1) state and causes the oscillator including the UJT 179 to stop its oscillation. Accordingly, two pulses are obtained as the output from this oscillator against one trigger. The waveform on the output side of the inverter 183 is shown in FIG.13J.

On the other hand, the output from the inverter 186 is applied to a flip-flop 187 as a trigger pulse. The outputs Q, $\overline{Q}$ from the flip-flop 187 are pulses C, $\overline{C}$ shown in FIGS.13D and 13O, which are inverted at each filed and supplied, on one hand, to NAND gates 188 and 189 to gate the output from the inverter 183. Pulse motor driving pulses shown in FIGS.13K and 13L from the NAND gates 188 and 189 are fed from output terminasl 190*a* and 190*b*, respectively. The pulse motor driving pulses shown in FIGS.13K and 13L correspond to the pulses shown in FIGS.3E and 3G. The operation states corresponding to the stepping-stopping operations of the pulse motor shown in FIGS.3D and 3F are shown in FIGS.13M and 13N.

The pulse $\overline{C}$ of the output $\overline{Q}$ from the flip-flop 187 shown in FIG. 13O is fed through an output terminal 191, as a feed pulse. This feed pulse corresponds to the feed pulse supplied from the feed pulse controller 77 (shown in FIG.8) to the switching pulse generator 75.

The pulse C of the output Q from the flip-flop 187 is applied to a flip-flop 192, as a trigger pulse. The outputs Q, $\overline{Q}$ from the flip-flop 192 become pulses D, $\overline{D}$ (shown in FIGS.13E and 13P) which are obtained by counting down the input trigger pulses C. The flip-flops 187 and 192 are reset by a reset signal from a terminal 193 so that their outputs Q record a (0) state at the innermost track during recording. The output pulses C and D, from the flip-flops 187 and 192, are used as the track indication pulses.

The NAND gates 194 to 198 constitute an equality detector. To the NAND gates 194 and 195, there are supplied pulses A and $\overline{A}$ from terminals 199*a* and 199*b* respectively and the pulses $\overline{C}$ and C from the flip-flop 187. To the NAND gates 196 and 197, there are supplied pulses B and $\overline{B}$ from terminals 200*a* and 200*b* and the pulses $\overline{D}$ and D from the flip-flop 192. The pulses A and B are respectively shown in FIGS. 13A and 13B. The track indication pulses C and D conicide with the frame pulse A and the color frame pulse B in the equality detector. The output from the equality detector is supplied through an inverter 201 to the NAND gate 176, as the color synchronizing pulse $C_S$ shown in FIG.13F, to gate the delayed vertical synchronizing signal. When the output signal (FIG.13C) from the mode switch beceomes (1), the pulses A and C and the pulses B and D are compared. When both the pulses A and C and the pulses B and D coincide with each other, the color synchronizing pulse $C_S$ becomes a (1) state. The pulses C and D are so adjusted that they start from (0), as previously described. Accordingly, the output from the NAND gate 176 becomes a trigger pulse shown in FIG. 13H.

The switching pulse used during recording and reproduction has a switching phase following the vertical synchonrizing signal whereas, the output from the feed pulse controller has a more delayed phase. Consequently, if these signals are synchronized anew for generating the switching pulse, there will be a delay of substantially one field. In order to avoid this, the pulse $\overline{C}$ is used as a pulse for generating the swtiching pulse. A pulse which is obtained at the flip-flop 202, responsive to a shifting of the pulse $\overline{C}$ by one field, is taken out of a terminal 203 as a two bit feed pulse and used instead of the track indication pulse D. After the renewed synchronization, these pulses indicate, at each reproduced field, the same values as the original track indication pulses C and D which were recorded.

Strictly speaking, when the recording is started at the innermost tracks, the recording of the lower channel is started in the field in which the head for the upper channel is moving. Consequently, the innermost upper channel remains unrecorded, and it is recorded only when the head returns to its original position. The same also applies, to the reprodcution, so that no adverse effect is caused on the reproduced picture. Accordingly, the foregoing does not pose any practical problem.

FIGS.14A to 14G respectively show a phase relationship of each pulse in the neighborhood of the vertical synchronizing pulse. As has been described with reference to FIGS.1 and 2, the video signal is recorded on the magnetic disc 11 at a rate of one field per track. In order to meet the requirements that the vertical synchronizing signal is not affected by a switching noise and that the switching noise does not appear on the reproduced picture, the phase of the record switching is selected so that it is in an equalizing pulse following the vertical synchronizing signal.

Figure 14:
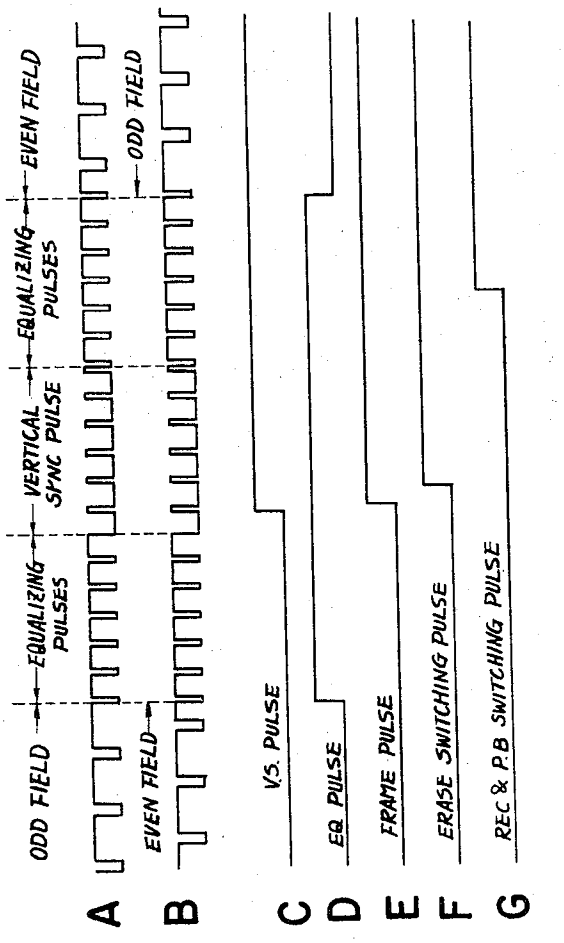
FIGS. 14A to 14G are, respectively, diagrams showing the phase relationships of the various pulses at a portion near the vertical synchronizing signal of the NTSC system color video signal.

FIGS.14A and 14B are respectively enlarged views in the neighborhood of the vertical synchronizing pulse of the NTSC system color video signal. A VS pulse is obtained from the vertical synchronizing pulse, and it has a phase as shown in FIG.14C, because a composite sync is differentiated and the rising edge of the first recessed portion of the vertical synchronizing pulse is detected. An EQ pulse is obtained from the equalizing pulse, and it has a phase as shown in FIG.14D, because it is taken out of the composite sync by utilizing a kind of resonance circuit as will be described later. The frame pulse is obtained by converting the composite sync at the H rate, differentiating it and gating it with the differentiated vertical synchronizing pulse. The phase of the frame pulse is delayed by the pulse width of the recessed portion from the vertical synchronizing pulse as shown in FIG.14E. The foregoing pulses are obtained from the input video signal or the external reference synchronizing signal.

The phases of erase switching pulse and recording-reproduction switching pulse respective (shown in FIGS.14F and 14G) are obtained by delaying the vertical synchronizing pulse in a monostable multivibrator. For the convenience of electronic editing, the erase switching pulse is selected so that it lags slightly behind the vertical synchronizing pulse. Similarly, the recording-reproduction switching pulse is selected so that it lags behind the erase switching pulse by about 3H. (This delay is dependent upon the physical space between the erasing head and the recording and reproducing head and the linear velocity of the magnetic disc and the heads). This is not only for the above described reason, but also for a reason that the erase pulse must precede the recording-reproduction pulse to enable the erase head to effect the preceding erasing operation.

Figure 15:
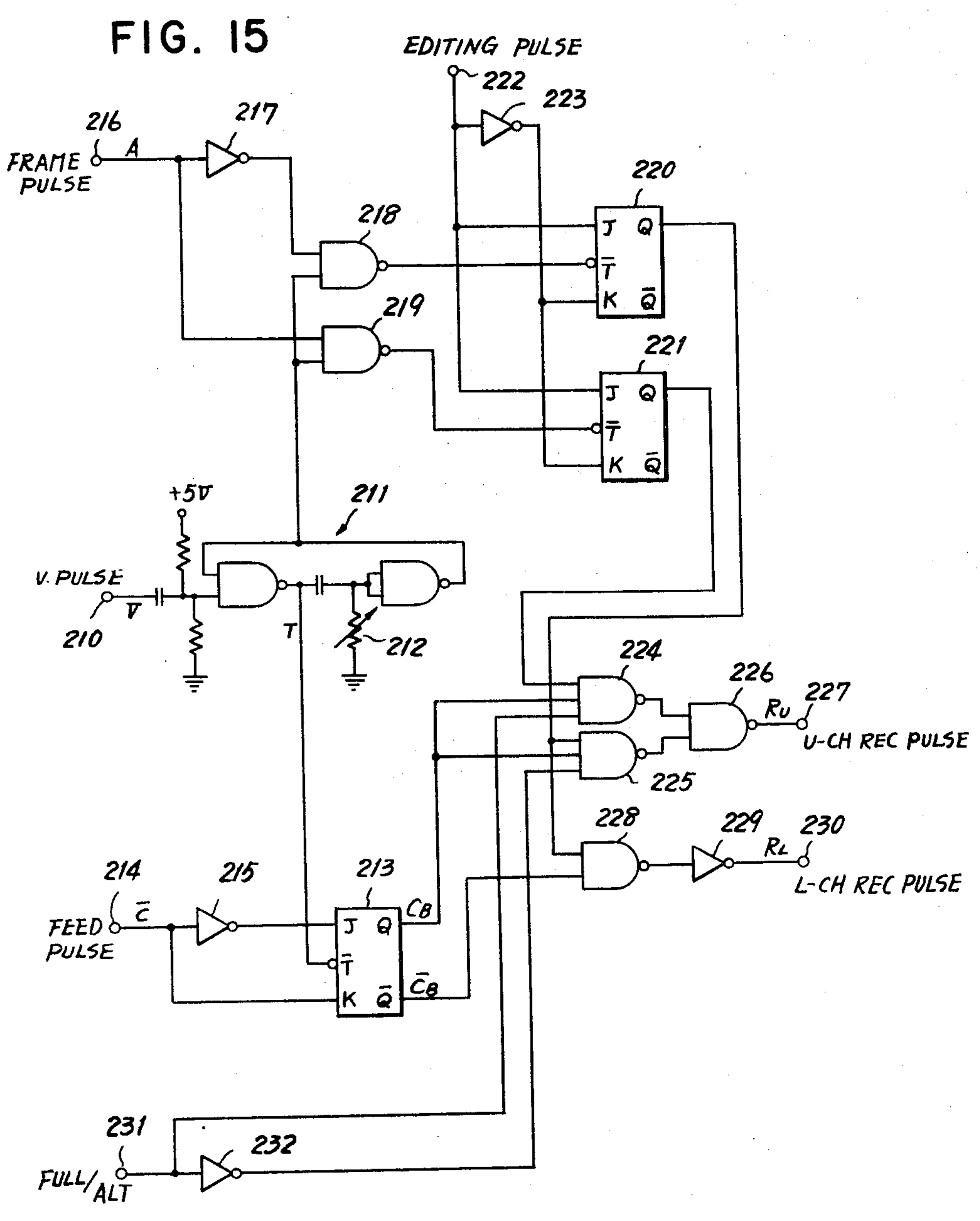
FIG. 15 is a circuit diagram of one embodiment of a recording pulse generator.

FIG.15 shows a concrete electrical circuit of one embodiment of the record pulse generator for the recording system in the switching pulse generator 75 shown in FIG.8. Incidentally, illustration and description of an erase pulse generator for the erasing system in the generator 75 will be omitted, because it has the same circuit construction as the record pulse generator, and they are different in phase only.

Figure 16:
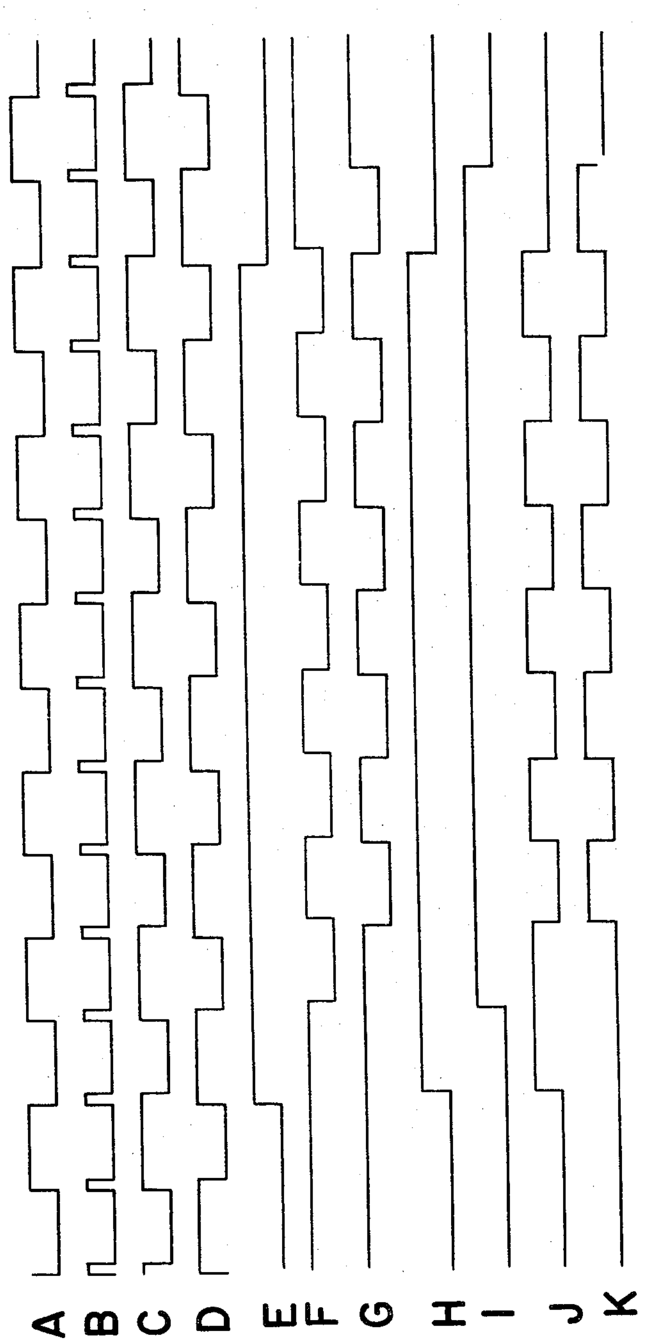
FIGS. 16A to 16K are, respectively, diagrams showing a signal waveform at each part of the recording pulse generator shown in FIG. 15.

The vertical synchronizing pulse (shown in FIG.14C) is received at an input terminal 210 and delayed by a monostable multivibrator 211. The output from the monostable multivibrator 211 is as shown in FIG.16B. The trailing edge of this pulse becomes the switching phase which is varied by a varaible resistor 212. The output T from the monostable multivibrator 211 is applied to a J–K flip-flop 213 as a timing pulse. The track indication pulse $\overline{C}$ (shown in FIG.16F) is applied from the terminal 191 (FIG.12) to an input terminal 214. The pulse C is obtained by inverting it in an inverter 215, from which it is applied to the J terminal of the flip-flop 213. The pulse $\overline{C}$ is directly applied to the K terminal of the flip-flop 213. A phase at which the output from the J–K flip-flop 213 is switched is determined by the output from the monostable multivibrator 211. The pulses $C_B$, $\overline{C}_B$ of the outputs Q, $\overline{Q}$ shown in FIG.16G become pulses which have the same value as the track indication pulse C in the same fields. The track indication pulse $\overline{C}$ shown in FIG.16F starts when an electronic editing pulse shown in FIG.16E reaches a (1) state and maintains the value at the final record field when the electronic editing pulse becomes a (0) state, i.e., upon completion of the recording.

The frame pulse A (FIG.16A) is sent from the color frame detector 73 (FIG.8) to an input terminal 216. The pulse $\overline{A}$ is applied to a NAND gate 218 via an inverter 217. The pulse A is applied directly to a NAND gate 219 to gate the output of the monostable multivibrator 211. THe output pulses of the NAND gates 218 and 219 (FIGS.16C and 16D) are respectively applied to J–K flip-flops 220 and 221. The output pulses of the NAND gates 218 and 219 undergo changes in a similar manner as the frame pulse A or $\overline{A}$. The phase of its trailing edge is determined by the monostable multivibrator 211. The output pulse of the NAND gate 218 breaks, as shown in FIG.16C, immediately after training edge of the frame pulse shown in FIG.16A. The output pulse of the NAND gate 219 ends, as shown in FIG.16D, one field after the trailing edge of the frame pulse.

The electronic editing pulse shown in FIG.16E is applied from an input terminal 222 to the J and K terminals of the J–K flip-flops 220 and 221 also and through an inverter 223 as pulses Ed and $\overline{Ed}$. The outputs Q of the J–K flip-flops 220 and 221 are synchronized anew as shown in FIGS.16H and 16I. The outputs of the J–K flip-flops 220 and 221 are gated together with the output of the J–K flip-flop 213 by NAND gates 224, 225 and 226 and then the resulting gated signal is fed to an output terminal 227, as an upper channel record pulse shown in FIG.16J. These outputs pulses are also gated by a NAND gate 228 and fed through an inverter 229 to an output terminal 230, as a lower channel record pulse shown in FIG.16K. In the record pulses shown in FIGS.16J and 16K, a (1) state designates a recording mode and a (0) state designates a not recording mode.

These is an alternate record mode in addition to a normal record (full field record) mode. This alternate mode is a mode in which one type of alternate fields (i.e., only odd (or even) fields in the input video signals) are recorded. In this case, odd (or even) fields only are supplied to the upper and lower channel heads for recording. The pulses shown in FIGS.16H and 16I are controlled by the frame pulse, When it appears, field is always either the odd or even field. The NAND gates 224 and 225 are employed as a circuit for switching the electronic editing pulse between the full field recording and alternate recording. Separate signals for full field/alternate field recording are supplied from a terminal 231 either directly or through an inverter 232 to the NAND gates 224 and 225. The NAND gate 226 is reversed when it has gated a signal which has been switching either to the full field recording or to the alternate recording, whereby it is used for generating the upper channel pulse.

The record pulse is obtained in the foregoing manner. In case of a normal recording, a perfect electronic editing is made by the color synchronizing pulse. In case of one field recording or a slow motion recording, odd fields and even fields are discriminated by the color synchronizing pulse and the flip-flops 220 and 221 shown in FIG.15. The field to be recorded on its track is recorded and left as a result of the preceding erasing. Accordingly, in any mode of the full field recording, the recorded fields can be perfectly separated into the four possible types of fields responsive to the track indication pulses C and D. When reproduced at a normal speed, the fields are reproduced as a regular NTSC system color video signal without a reproduced signal processing. In case of the alternate field recording,the reproduced fields are always either odd fields or even fields in which case the reproduced signal processing is required even when they are reproduced at a normal speed.

H/2 SIGNAL PROCESSING

If the above described electronic editing system or recording system is adopted, the normal reproduction of the full field recorded signal does not require any signal processing. However, in case of reproduction of such modes as a still reproduction, slow motion reproduction, quick motion reproduction and a reverse reproduction, the the relation of odd and even fields and the phase relation of the subcarrier do not coincide with those of the NTSC system color video signal.

Figure 17:
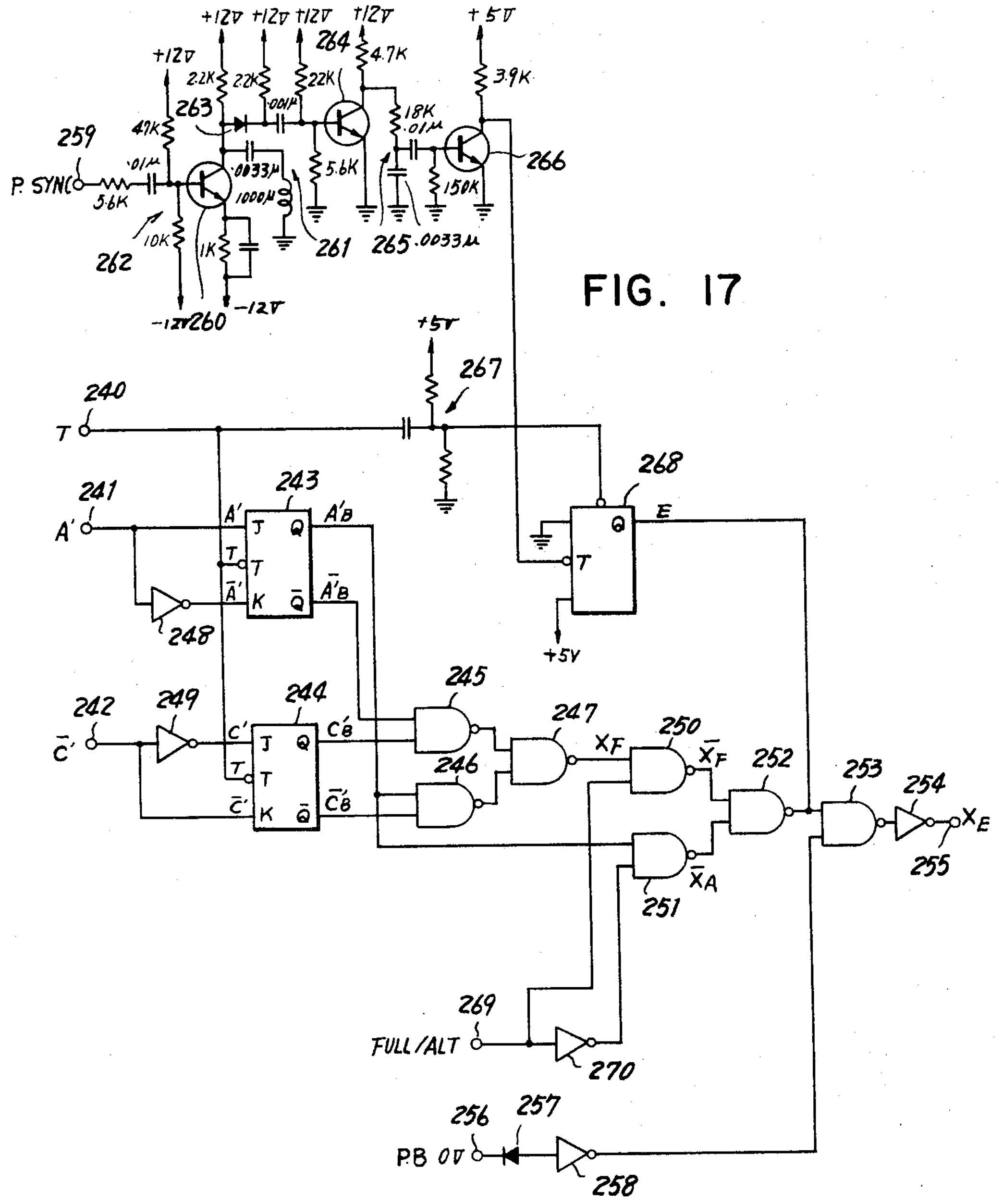
FIG. 17 is a circuit diagram of one embodiment of a H/2 delay pulse generator.

FIG.17 shows a specific circuit of one embodiment of a H/2 delay pulse generator for operating a H/2 delay line. This line is adapted to cause the odd and even fields of the reproduced video signal to coincide with the odd and even fields of the external reference signal during a reproduction period. A, frame pulse A′ generated from the external reference synchronizing signal during reproduction, is applied from an input terminal 241 directly to a J terminal of a J–K flip-flop 243 and to a K terminal of the flip-flop 243 via an inverter 248 where it is inverted to a pulse $\overline{A}'$. Similarly, a track indication pulse C′ is applied from an input terminal 242 to J and K terminals of a J–K flip-flop 244, respectively, either as a pulse C′ after have been inverted in an inverter 249 or directly as the pulse $\overline{C}'$. The output pulse T of the monostable multivibrator 211 (FIG. 15) is applied to a terminal 240. From there, pulse T is supplied to J–K flip-flops 243 and 244, as a timing pulse. In the J–K flip-flops 243 and 244, the frame pulse A′ and the track indication pulse C′ are caused to coincide in their phase with trailing edge of the timing pulse T and they appear as its outputs $A'_B$ and $C'_B$. The pulse $C'_B$ is used as a switching pulse during reproduction. The output pulses $A'_B$ and $C'_B$ are supplied to an equality detector comprising NAND gates 245, 246 and 247. The output $X_F$ from this equality detector is expressed in Boolean algebra as $$X_F = A'_B \cdot \overline{C}'_B + \overline{A}'_B \cdot \overline{C}'_B.$$

Namely, the output $X_F$ becomes a (0) state when the pulse $A'_B$ and $C'_B$ coincide with each other, and it beocmes a (1) state when these pulses do not coincide with each other.

As previously described, in case a signal recorded on alternate fields is to be reproduced, H/2 processing is made for each field regardless of a reproduction mode, i.e, normal, slow motion, still etc., since either odd or even field only is recorded on each track. As a H/2 delay pulse for achieving this H/2 processing, the pulse $A'_B$ is employed. This is because only the even field is recorded during recording. In case only the odd field is recorded during recording, the pulse $\overline{A}'_B$ is used.

NAND gates 250, 251 and 252 constitute an electronic switch for switching the full field and the alternate field. As switching modes, modes such that the full field becomes a (1) state and the alternate field becomes a (0) state are used. Since the H/2 delay pulse is not required during recording, it is gated at the NAND gate 253 so that the output is obtained only during reproduction. The delay pulse is fed out through an inverter 254 to an output terminal 255 as an output pulse $X_E$. A control voltage, which is zero in a reproduction mode and becomes +24V in other modes and is applied to a terminal 256. Due to a diode 257 and an inverter 258, the pulse becomes a (1) state in the reproduction mode and a (0) state in any other modes.

The switching phase of the H/2 delay pulse obtained in the above described manner is found, as in other record pulses, in the equalizing pulse following the vertical synchronizing pulse. Accordingly, if the reproduced signal is directly subject to the H/2 processing,the vertical synchronizing signal itself is delayed by H/2. As a result, the reproduced picture flickers vertically, presenting a visual difficulty. To settle this problem, the vertical synchronizing signal should be prevented from become delayed by H/2, even if the field is subject of the H/2 processing. A concrete device for this purpose is described hereinbelow.

The positive sync pulse from the terminal 106 (FIF.10) is supplied to an input terminal 259. This positive sync pulse is applied to the base of an amplifying transistor 260, which is connected at its collector with a resonance circuit 261. A differentiation circuit 262 on the input side and the resonance circuit 261 causes the peak voltage in the sync portion to be different from that in the equalizing pulse portion. Accordingly, the collector output of the transistor 260 is clipped by a diode 263 and switched by a transistor 264, whereby the equalizing pulse is obtained. The equalizing pulse thus obtained is integrated in an integration circuit 265 to avoid influence of noise and then applied to the base of a transistor 266. The output is corrected in its form at the transistor 266 to become a pulse which is synchronized with the phase of substantially the first equalizing pulse. This pulse is supplied to a J–K flip-flop 268 as a timing pulse. In the meanwhile, the pulse T appears at the terminal 240 and is differentiated in a differentiation circuit 267. Then it is applied to a set terminal of a J–K flip-flop 268. A pulse E, which is the output Q of the J–K flip-flop 268, is a pulse which occurs at the first equalizing pulse and rises in phase with the pulse T. The output pulse E of the flip-flop 268 is applied as a logical OR input with the output of the NAND gate 252. Accordingly, the H/2 delaye pulse $X_E$ which is finally fed from the output terminal 255 is always in a (0) state in the vertical synchronizing portion and in the same state as the pulse $X_F$ or $X_A$ in the other portion.

In order to produce a pulse, without using the equalizing pulse for preventing the vertical synchronizing signal from being delayed by H/2, the vertical synchronizing signal may be delayed by about one field. This method, however, is not preferable since jitter results therefrom. Therefore, the above described method using the equalizing pulse has been adopted in the system according to the invention.

CHROMA INVERTING PROCESSING

Chroma inverting processing is different from the above described H/2 processing since does not require consideration of the vertical synchronizing period. It still requires, however, the switching between the full field and the alternate field and the switching between reproduction and recording.

In the alternate field record mode, the recorded field is always either the odd field or the even field only. As a result. a pulse which indicates a phase of a chroma signal in the track indication pulse becomes the pulse C, which is in synchronization with the movement of the head. Since the recorded field is eithe the odd field or the even field only the chroma inverting pulse does not change, regardless of whether the reproduction mode is in a forward or reverse mode. The H/2 processing can be made constantly regardless of the reproduction mode. Accordingly, as in the case of H/2 delay pulse, the track indication pulse is caused to concide with a color frame pulse B′, which is generated from the external reference synchronizing signal during reproduction. Pulse B′ incidates the phase of the chroma. The chroma inverting pulse is in a (1) state during a field at which coincidence does not occur, whereby the chroma inverting processing is effected.

Figure 18:
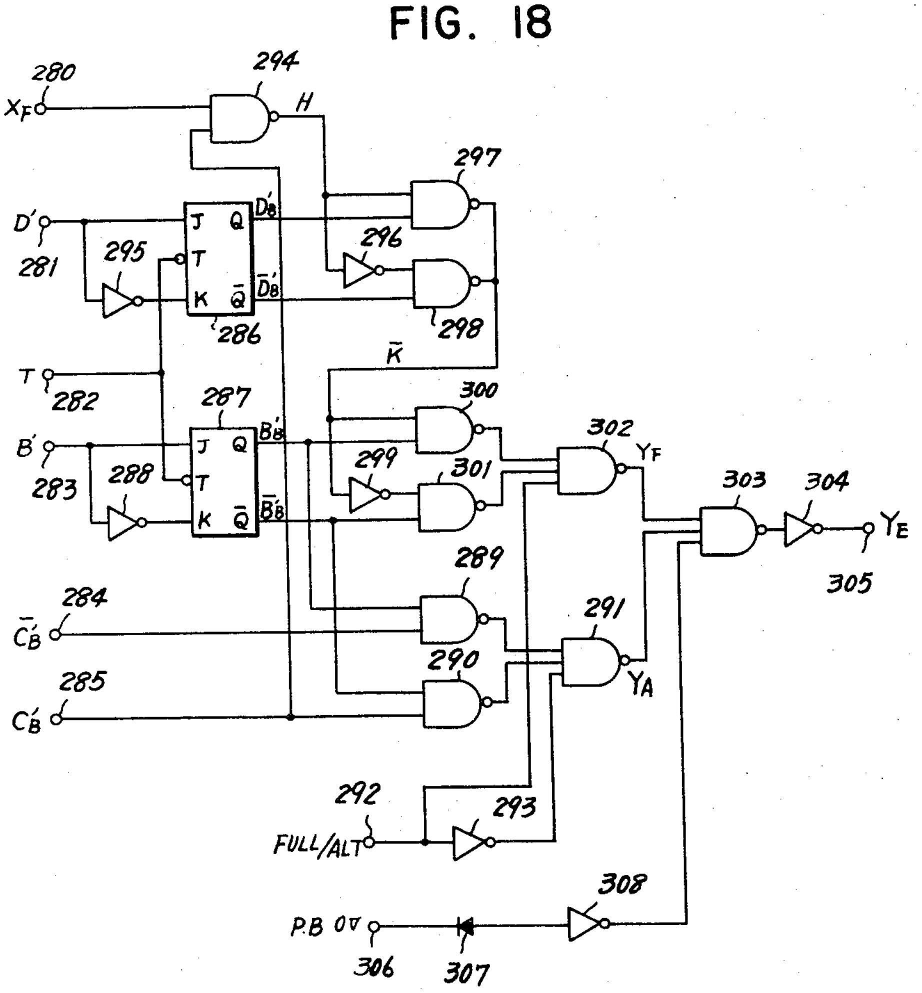
FIG. 18 is a circuit diagram of one embodiment of a chroma inverting pulse generator.
Figure 19:
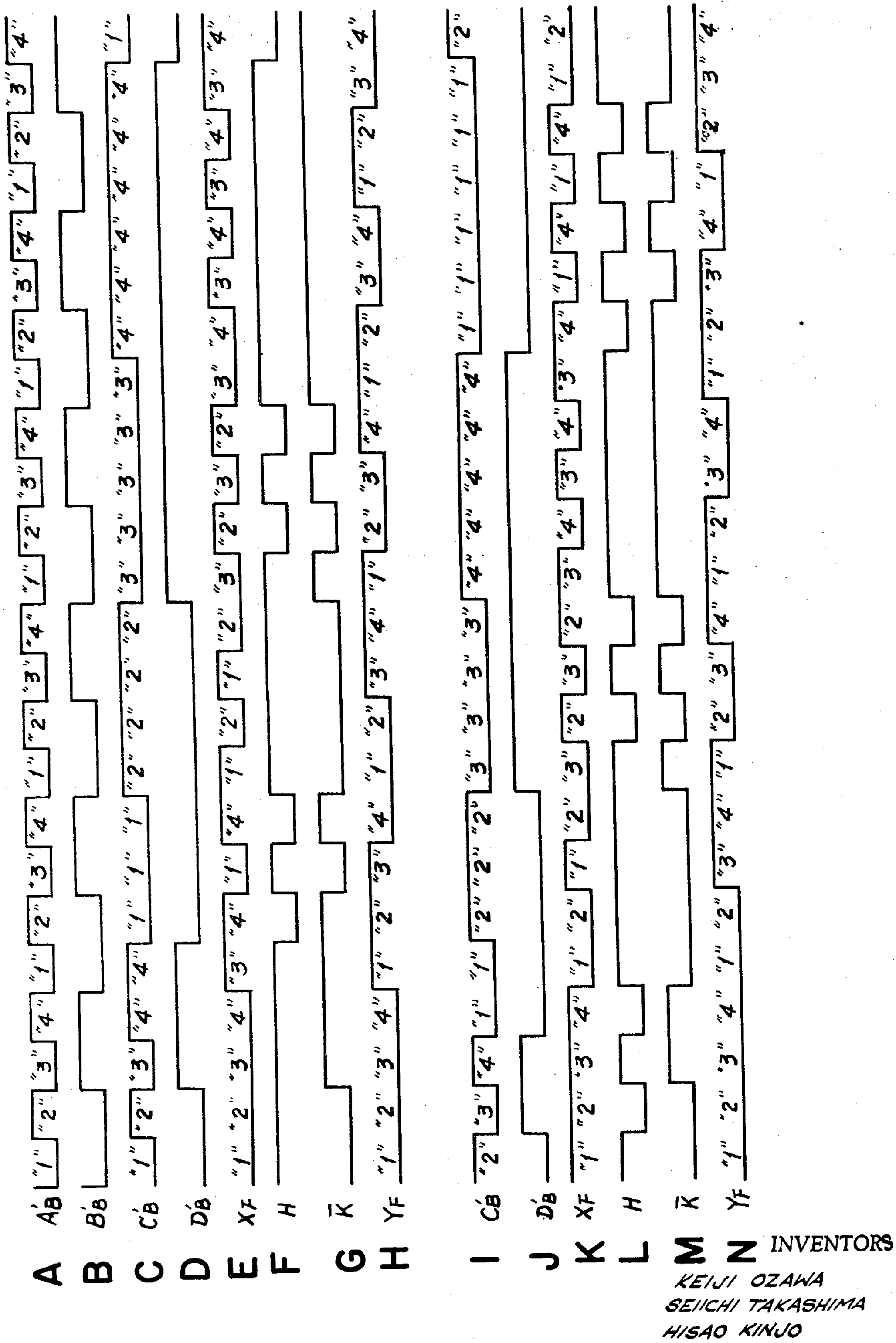
FIGS. 19A to 19N are, respectively, diagrams showing waveforms of signals and converted field at each part of the reproduced signal processing circuit shown in FIG. 7, in case of a variable slow motion forward playback at a full field recording.
Figure 20:
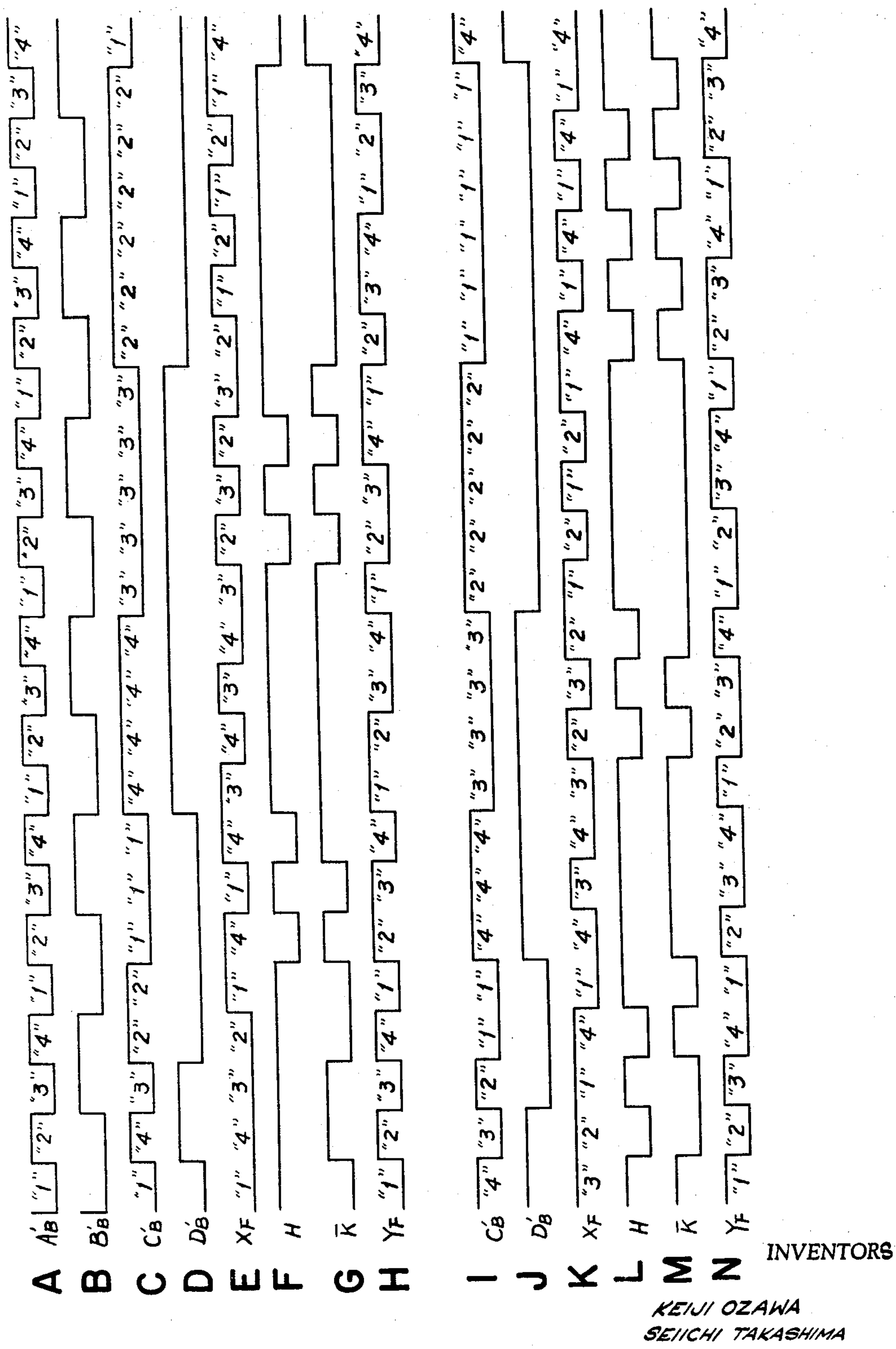
FIGS. 20A to 20N are, respectively, diagrams showing waveforms of signals and converted field at each part of reproduced signal processing circuit shown in FIG. 7 in case of a variable slow motion reverse playback at a full field recording.
Figure 21:
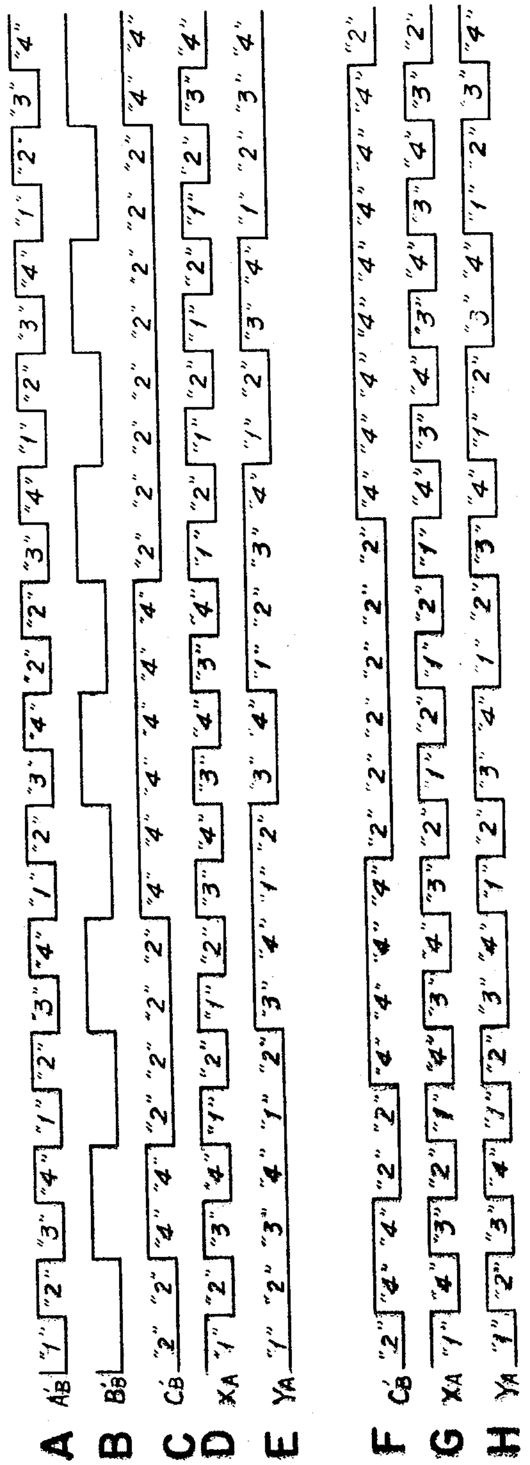
FIGS. 21A to 21H are, respectively, diagrams showing waveforms of signal and converted field at each part of the reproduced signal processing circuit shown in FIG. 7 in case of a variable slow motion playback at an alternate field recording.

FIG.18 is a circuit digarm of one embodiment of the chroma inverting pulse generator. The color frame pulse B′ appears at a terminal 283 and is applied to J and K terminals of a J–K flip-flop 287, the application being directly and through an inverter 288. In the J-K flip-flop 287, the pulse B′ is synchronized anew and is obtained as an output pulse $B'_B$. The pulse T appears at a terminal 282 and is used as a timing pulse for the J–K flip-flop 287. The NAND gates 289, 290 and 291 constitute an equality detector. The output pulses $B'_B$ and $\bar{B}'_B$ from the J-K flip-flop 287 and the pulses $\bar{C}'_B$ and $C'_B$ appearing at terminals 284 and 285 are supplied to the equality detector. An output signal $Y_A$ becomes a (0) state when both pulses coincide with each other and becomes a (1) state when they do not coincide, there providing an output signal at a NAND gate 291. This output signal $Y_A$ is expressed in Boolean algebra as $$Y_A = B'_B\bar{C}'_B + \bar{B}'_B \cdot C'_B$$

The NAND gate 291 is also used for switching the chroma inverting pulse between the full field and the alternate field. A pulse appearing at a terminal 292 is applied to the gate 291 through an inverter 293. Since the output signal from the terminal 292 is a logical "1" in the full field mode, the chroma inverting pulse in the alternate field mode is controlled by the output of the inverter 183.

In case of the full filed recording, all the four kinds of fields of the color video signal in the NTSC system are recorded. In reproduction thereof, however, the H/2 processing does not become constant in some reproduction mode. In this case, it is necessary to take into consideration the infludence of the H/2 processing on the chroma inverting pulse. More specifically, in the alternate field mode, the H/2 processing is made at one alternate field regardless of the reproduction mode. Thus the influence of the H/2 processing can be ignored if a frame is taken as a unit. In the case of the full field mode, the track indication pulse D′, which indicates the phase of the chroma, does not undergo change even if the H/2 processing is made. Accordingly, if the pulse D′ is simply caused to coincide with the color frame pulse B′ (generated by the external reference synchronizing signal) during reproduction and if the chroma signal is inverted at a field where the coincidence does not occur, a normal NTSC system color video signal is not reproduced.

There are forward and reverse modes in reproduction. In the reverse mode, the order of the recorded fields, i.e., the field order of the normal NTSC system color video signal "1", "2", "3", "4", "1", "2", . . . is changed to the order of, for instance, "2", "1" , "4", "3", "2", "1", . . . . . . Without considering the influence of this field order, the NTSC system color video signal cannot be reproduced even in a reverse reproduction at a normal speed. The influences of the forward and reverse modes can be indicated by the movement of the head, i.e, the pulse C'. Similarly, the influence of the fast mode can be indicated by the pulse C'. In case of the alternate field mode, two kinds of recorded fields are different in the phase of the chroma from each other by 180°. Accordingly, the chroma inverting pulse is the same whether the mode is forward or reverse, so that the field order is not reversed.

In consideration of the foregoing, the chroma inverting pulse $Y_F$, for the full field, is generated by the following circuit construction. In view of the influence of the H/2 delay pulse and the influence of the forward and reverse modes, the H/2 delay pulse $X_F$ appearing at terminal 280 and the track indication pulse $C'_B$ appearing at terminal 285 are gated at a NAND gate 294, thereby to obtain an output pulse H. The track indication pulse D' appearing at a terminal 281 is synchronized anew by a J–K flip-flop 286 in which the pulse D' is applied to the J terminal. The pulse $\overline{D}'$ is passed through an inverter 295 and applied to the K terminal. The pulse T appearing at a terminal 282 is used as a timing pulse. Output pulses $D'_B$ and $\overline{D}'_B$ of the J–K flip-flop 286 are respectively applied to NAND gates 297, 298. The output pulse H of the NAND gate 294 and a pulse which is made by inverting the pulse H at an inverter 296, are also applied to NAND gates 297 and 298, which constitute an equality detector. An output K of this equality detector is expressed in Boolean algebra as $$\overline{K} = H \cdot D'_B + \overline{H} \cdot \overline{D}'_B$$

$$H = \overline{X_F \cdot C'_B}$$

The pusle becomes a (1) state when the two input pulses coincide with each other and becomes a (0) state when they do not coincide with each other. This output pulse K can be considered as a pulse indicating the phase of a chroma signal. Pulse K is obtained by modifying the track indication pulse $D'_B$ that indicates the phase of the chroma signal during reproduction. The modification is in consideration of the H/2 delay pulse $X_F$ and the movement of the head in the forward and reverse modes.

The output pulse K is applied directly and through an inverter 299, together with the output pulses $B'_B$ and $B'_B$ of the J–K flip-flop 287, to the equality detector NAND gates 300 and 301. An output pulse $Y_F$ of this equality detector is a pulse which becomes a (0) state at a field where the two input pulses coincide with each other and becomes a (1) state at a field where they do not so coincide. The output pulse $Y_F$ is expressed in Boolean algebra as $$Y_F = \overline{K} \cdot B'_B + K \cdot \overline{B}'_B$$

A NAND gate 302 is also used, as in the case of the NAND gate 291, as a full field-alternate field switching gate. The output pulse $Y_F$ of the NAND gate 302 is supplied to a NAND gate 303 together with the output pulse $Y_A$ of the NAND gate 291. In the NAND gate 303, the pulses are gated, as in the case of the H/2 delay pulse, so that an output is obtained only during reproduction. The output of the NAND gate 303 passes through an inverter 304 and is obtained as the chroma inverting pulse $Y_E$ from an output terminal 305. A control voltage which is zero in the reproduction mode, and becomes +24V in other modes, appears at a terminal 306. the control voltage is applied through a diode 307 and an inverter 308 to the NAND gate 303.

FIGS.19 to 23 show signal waveforms in various modes of the reproduced signal processing pulse generator.

FIGS.19A to 19N show pulse waveforms and field orders in the case of a variable slow motion forward reproduction at the full field recording. The pulses $A'_B$ and $B'_B$, shown in FIGS.19A and 19B, are pulses which have been obtained by causing the frame pulse to coincide with the color frame pulse made from the external reference synchronizing signal during reproduction. The figures "1", "2", "3", and "4" in each figure indicate the previously described four kinds of fields. The pulses $C'_B$ and $D'_B$, shown in FIGS.19C and 19D, are pulses which have been obtained by newly synchronizing the track indication pulses C and D by means of the pulse T.

The figures show the case in which a slow motion reproduction ratio is veried from 1 : 1 to 2 : 1, 3 : 1, . . . . . . . 6 : 1 . . . . . . . . . The pulse $X_F$, shown in FIG.19E, is a H/2 delay pulse in the full field mode. The pulse $X_F$ becomes a (0) state when the pulse $A'_B$ and the pulse $C'_B$ coincide with each other, and becomes a (1) state when they do not. The H/2 processing is made when the pulse $X_F$ is in a (1) state, whereby the field numbers shown in FIG.19C are converted into those shown in FIG.19E when the pulse $X_F$ is in a (1) state. The pulse H, shown in FIG.19F is a pulse which has been obtained by NAND -gating the pulses $X_F$ and $\overline{C}'_B$. The pulse K, shown in FIG.19G, is a pulse which has been obtained by causing the pulses H and $D'_B$ to coincide with each other. The pulse $\overline{K}$ becomes a (1) state when the coincidence occurs and becomes a (0) state when the coincidence does not occur. The pulse $Y_F$, shown in FIG.19H, is a chroma inverting pulse. When the pulse $Y_F$ becomes a (1) state, the field numbers shown in FIG.19E are converted into those shown in FIG.19H. The field order of the signal which has undergone the reproduced signal processing, as shown in FIG.19H, is completely coincidental with the field order of the external reference synchronizing signal during reproduction shown in FIG.19A. Thus, a complete NTSC system color video signal is obtained.

FIGS.19I and 19J show a case in which the pulses $C'_B$ and $D'_B$ start reproduction from the field "2". The pulses $X_F$, H, $\overline{K}$ and $Y_F$ are respectively shown in FIGS.19K, 19L, 19M and 19N. The same consideration will apply to cases in which reproduction is started from the filed "3" or "4".

FIGS.20A to 20N show pulse waveforms and field orders in case of a variable slow motion reverse reproduction at the full field recording. FIGS.20A to 20H show pulse waveforms and field orders in case a variable slow motion reverse reproduction is started from the field "1" and proceeds in the order of "4", "3", "2", "1". FIGS.20I to 20N show pulse waveforms and field orders in case the variable slow motion reverse reproduction is started from the field "4". Each pulse is generated in the same circuit as the pulse shown in FIG.19.

FIGS.21A to 21H show pulse waveforms and field orders in case of a variable slow motion reproduction at the alterante field recording. In this case, the waveforms and field orders in a forward reproduction mode are the same as those in a reverse reproduction mode, because only the odd fields or even fields are recorded on the record tracks. The pulses $A'_B$ and $B'_B$, shown in FIGS.21A and 21B, are the same as the pulses $A'_B$ and $B'_B$ shown in FIGS.19A and 19B. The pulse $C'_B$, shown in FIG.21C, is a pulse which has been obtained by newly syncrhonizing the track indication pulse C. The slow motion reproduction ratio is varied from 1 : 1 to 2 : 1, 4 : 1, 6 : 1, 8 : 1, . . . . . . The pulse $X_A$, shown in FIG.21D, is a H/2 delay pulse which is always constant and the same as the pulse $A'_B$. The pulse $Y_A$, shown in FIG.21E, is a chroma inverting pulse which becomes a (0) state when the pulses $B'_B$ and $C'_B$ coincide with each other, and becomes a (1) state when they do not coincide with each other. The chroma inverting pulse $Y_A$ effects the chroma inverting processing when it is in a (1) state. FIGS.21F to 21H show the pulses $C'_B$, $X_A$ and $Y_A$, as they appear when the reproduction is started from the field "2". The same considerations will apply to cases in which the reproduction is started from the field "3" or "4".

FIGS.22A to 22N show pulse waveforms and field orders in a case of a fast forward reproduction, at the full field recording. During fast reproduction, the period of the pulse motor movement is normal, but the motor rotates at a rate which moves the heads four track pitches at a time. Consequently, the head reproduces one alternate record tracks. Hence, there are only two kinds of reproduced fields, for instance, field "1" and field "2", as shown in FIG.22C. Accordingly, the NTSC system color video signal can be obtained by effecting the chroma inverting processing during the (1) state period of a pulse $Y_F$, shown in FIG.22H. FIGS.22I to 22N show a case in which the reproduction is started from the field "2".

FIGS.23A to 23N show pulse waveforms and field orders in a case of a fast reverse reproduction, at the full field recording. The relations relationships shown in these figures will be readily understood from the description made previously, in connection with the fast forward reproduction shown in FIGS.22A to 22N.

While the invention has been described with respect to the specific embodiments, various modifications and variations thereof will be apparent to those skilled in the art . Therefore, the appended claims should be construed to cover all equivalent structures which do not depart from the scope of the invention.

What we claim is:

1 A recording system comprising magnetic recording and reproducing apparatus means including a rotary magnetic medium having at least one magnetic recording surface, means for rotating said magnetic medium, means comprising a plurality of magnetic heads for recording a video signal on and reproduce it from said rotary magnetic medium while said magnetic medium rotates and said heads stand still for a predetermined period, means for moving said plurality of magnetic heads at the end of said period, with said heads moving alternately and in an intermittent stepping movement, said recording system comprising means responsive to an input NTSC system video signal for producing cyclically recurring frame pulses, each having a period equal to two fields, means responsive to a vertical sync pulse of said video signal for producing a feed pulse for causing said magnetic heads to move in said intermittent stepping movement, means responsive to said frame pulse for discriminating between the odd fields and even fields of the video signal and for producing from said feed pulse a record switching pulse which is synchronized in phase with the discriminated field, and means responsive to said record switching pulse for causing said magnetic heads to record said video signal.

2. The recording system as defined in claim 1 wherein said rotary magnetic medium has two magnetic surfaces on the upper and lower sides thereof, and said magnetic heads comprises two magnetic heads which are respectively in abutting contact with said upper and lower magnetic surfaces, and means for alternately making an intermittent stepping movement responsive to said feed pulse.

3. A recording system comprising a magnetic recording and reproducing apparatus means including a rotary magnetic medium having at least one magnetic surface, means for rotating said medium, means comprising a plurality of magnetic heads which record a NTSC video signal on and reproduce it from said magnetic medium as said medium rotates while said heads stand still, intermittent stepping means for periodically moving said plurality of magnetic heads alternately, said recording system comprising means for separating a synchronizing signal from an input NTSC system color video signal means for separating a subcarrier from said color video signal, means responsive to said separated subcarrier for making a continuous signal, means responsive to said separated synchronizing signal and said subcarrier signal for producing cyclically recurring frame pulses and color frame pulses, each of said frame pulses having a period of two fields and each of said color frame pulses having a period of four fields, gating means responsive to said separated synchronizing signal and a color synchronizing pulse for producing track indication pulses, each comprising a feed pulse and a two bit feed pulse, means responsive to said track indicating pulses for causing said magnetic heads to move alternately and in an intermittent stepping movement, means for producing said color synchronizing pulses responsive to a coincidence of said frame pulses, said color frame pulses, said feed pulse, and two bit feed pulses, and means responsive to said frame pulses for disciminating between the odd fields and even fields of the video signal and for producing record switching pulses responsive to said feed pulses, each of said record switching pulses being synchronized in phase with the discriminated field, and means responsive to said record switching pulses for switching said magnetic heads for recording said video signal.

4. The recording system as defined in claim 3 wherein said means for producing the frame pulses and the color frame pulses comprise means for producing the frame pulses by causing said separated synchronizing signal to coincide in phase with said continuous signal made from the subcarrier, and means for producing the color frame pulses by counting down said frame pulses.

5. The recording system as defined in claim 3 wherein said means for producing track indication pulses comprises means including a NAND gate which gates a signal obtained from said separated synchronizing signal and said color synchronizing pulses, means for producing the feed pulses responsive to the output of said NAND gate, and means for producing the two bit feed pulses by counting down said feed pulses.

6. The recording system as defined in claim 3 wherein said means for producing the color synchronizing pulses comprise an equality detector having the color synchronizing pulse as an output, said equality detector generating said output responsive to a coincidence of said frame pulses, said color frame pulses, said feed pulse, and said two bit feed pulse.

7. The recording system as defined in claim 3 wherein said means for producing said record switching pulses comprise means responsive to said frame pulses and a signal obtained from the vertical synchronizing signal for producing pulses for discriminating between the odd fields and the even fields, means for newly synchronizing said feed pulses to become synchronized in phase with said vertical synchronizing signal, and means for producing said record switching pulses responsive to a gating of said feed pulses as synchronized anew and to said odd field-even field discrimination pulses.

8. The recording and reproducing system as defined in claim 3 which further comprises field setting means responsive to one-half of a horizontal signal delay pulse for controlling the signal reproduced from said rotray magnetic medium by said magnetic heads so as to delay the signal by an H/2 period at a predetermined field thereby converting the field order so that the odd fields and the even fields appear alternately, chroma inverting means for controlling said reproduced signal responsive to chroma inverting pulses and inverting the phase of the subcarrier by 180° at a predetermined field, means responsive to frame pulses produced from an external reference synchronizing signal and the track indication pulses for producing said H/2 delay pulse having a switching phase in an equalizing pulse, and means responsive to color frame pulses produced from the external reference synchronizing signal and the track indication pulses for producing said chroma inverting pulses.

9. The recording and reproducing system as defined in claim 8 which further comprises means for supplying the external reference synchronizing signal and an external reference subcarrier, and switching relay means for switching said supply of the synchronizing signal and the subcarrier from said separating means to said frame and color frame pulses producing means, and for switching a supply of the external reference synchronizing signal and the external reference subcarrier from said supply means to said frame and color frame pulses producing means.

10. A disk type magnetic recorder for NTSC type of color television signals, said recorder comprising means for detecting at least two field-types of signals which follow each other in an alternating-field-type of sequence found in said NTSC type of signal, means for playing back said signals with said field-types occurring in a non-alternating-field-type sequence which does not appear in NTSC types of signals, and means for adjusting said played back signals to cause said successively played back field-types to have said alternating-field-type sequence.

11. A color video signal recording system comprising a magnetic recording and reproducing apparatus including a rotary magnetic medium having at least one magnetic surface, means for rotating said medium in a synchronous relationship with a vertical synchronizing signal in a color video signal, two magnetic heads, means responsive to vertical synchronizing signals in said video signal for moving said magnetic heads alternately and intermittently over said magnetic surface while in engagement therewith, one of said magnetic heads being held in its stationary state while the other of the magnetic heads is making a shifting movement, means for applying to a stationary one of the magnetic heads a signal portion derived from said color video signal, means for thereafter applying the next succeeding signal portion to the other of the magnetic heads when it reaches its stationary state, said one of the magnetic heads thereafter making its shifting movement, whereby said apparatus successively records the derived signal portions on said magnetic surface as concentric circular tracks, means for separating a synchronizing signal from said color video signal, means for separating a subcarrier signal from said color video signal, first oscillator means responsive to the separated subcarrier signal for generating a continuously oscillating signal having the same frequency as said subcarrier signal, means responsive to said separated synchronizing signal for producing a frame pulse having a period of two fields, means responsive to said separated synchronizing signal and said frame pulse for producing the output signal of said first oscillator means and a color frame pulse having a period of four fields, means responsive to the separated synchronizing signal for producing the vertical synchronizing signal, second oscillator means responsive to a coincidence of said vertical synchronizing signal and a color synchronizing pulse for generating a first pulse signal, first flip-flop circuit means responsive to the first pulse signal for producing a second pulse signal having a predetermined pulse width, second flip-flop circuit means responsive to said second pulse signal for producing a feed pulse, means responsive to said feed pulse and said first pulse signal for producing driving pulses which drive said magnetic head moving means, means responsive to said feed pulse for producing a two bit feed pulse having a period equal to two of said feed pulses, equality detector means responsive to a coinciding of said frame pulse and said color frame pulse with the feed pulse and the two bit feed pulse for producing said color synchronizing pulse, means responsive to said vertical synchronizing signal and said frame pulse for discriminating between the odd fields and even fields of the color video signal and for producing a record switching pulse in response to said feed pulse, said record switching pulse being synchronized in phase with the discriminated field, and means responsive to said record switching pulse for switching said magnetic heads for recording the signal portions of the color video signal.

12. A reproducing system comprising the magnetic recording and reproducing apparatus including the rotary magnetic medium recorded with the color video signal according to the recording system of claim 11, said reproducing system comprising means for producing a reference signal, means for separating a synchronizing signal from said reference signal, means for separting a subcarrier signal from said reference signal, first oscillator means responsive to the separated subcarrier signal for oscillating a continuous signal having the same frequency as said subcarrier signal, means responsive to said separated synchronizing signal for producing a frame pulseh having a period of two fields, means responsive to the separated synchronizing signal and said frame pulse for producing the output signal of said first oscillator means and a color frame pulse having a period of four fields, means responsive to the separated synchronizing singal for producing a vertical synchronizing signal, second oscillator means responsive to a coincidence of said vertical synchronizing signal with a color synchronizing pulse for generating a first pulse signal, first, flip-flop circuit means responsive to the first pulse signal for producing a second pulse signal having a predetermined pulse width, second flip-flop circuit means responsive to said second pulse signal for producing a feed pulse, means responsive to said feed pulse and said first pulse signal for producing driving pulses which drive said magnetic head moving means, means responsive to said feed pulse for producing a two bit feed pulse having a period twice said feed pulse, equality detector means responsive to a coincidence of said frame pulse and said color frame pulse with the feed pulse and the two bit feed pulse for producing said color synchronizing pulse, means responsive to said vertical synchronizing signal and said frame pulse for discriminating between the odd fields and even fields of the recorded color video signal and for producing a reproduction switcing pulse in response to said feed pulse, said reproduction switching pulse being synchronized in phase with the discriminated field, and means responsive to said reproduction switching pulse for switching said magnetic heads for reproducing the color video signal.

13. The reproducing system as defined in claim 12 further comprising means responsive to a coincidence of said frame pulse with said feed pulse for producing an H/2 delay pulse having a switching phase in an equalizing pulse of the separated synchronizing signal, delay means for delaying the reproduced color video signal by an H/2 period, and field setting means responsive to said H/2 delay pulse for controlling said delay means so that the odd fields and the even fields appear alternately.

14. The reproducing system as defined in claim 13 further comprising means responsive to a coincident of said H/2 delay pulse, said color frame pulse, said feed pulse and said two bit feed pulse for producing a chroma inverting pulse, chroma inverting means for inverting the phase of the subcarrier of the reproduced color video signal by 180°, and control means responsive to said chroma inverting pulse for controlling said chroma inverting means so that the field order of the output signal of said control means satisfies frequency interleaving.

* * * * *